US012603689B2

(12) United States Patent
Rao et al.

(10) Patent No.: US 12,603,689 B2
(45) Date of Patent: Apr. 14, 2026

(54) METHODS, ARCHITECTURES, APPARATUSES AND SYSTEMS FOR ENABLING FAST BEAM SWITCHING

(71) Applicant: InterDigital Patent Holdings, Inc., Wilmington, DE (US)

(72) Inventors: Jaya Rao, Montreal (CA); Faris Alfarhan, Montreal (CA); Paul Marinier, Brossard (CA); Umer Salim, Vallauris (FR); Ananth Kini, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/809,892

(22) Filed: Aug. 20, 2024

(65) Prior Publication Data

US 2026/0058715 A1 Feb. 26, 2026

(51) Int. Cl.
*H04B 7/06* (2006.01)
*H04W 36/06* (2009.01)
(Continued)

(52) U.S. Cl.
CPC ........ *H04B 7/06958* (2023.05); *H04W 36/06* (2013.01); *H04W 72/046* (2013.01); *H04W 72/23* (2023.01)

(58) Field of Classification Search
CPC .. H04B 7/088; H04B 7/0695; H04B 7/06964; H04B 7/06952; H04B 7/0617;
(Continued)

(56) References Cited

U.S. PATENT DOCUMENTS

| 2021/0184746 A1* | 6/2021 | Park | H04W 56/001 |
| 2022/0124739 A1* | 4/2022 | Bai | H04W 72/542 |

(Continued)

OTHER PUBLICATIONS

Third Generation Partnership Project (3GPP), "Physical Layer Procedures for Data", Technical Specification Group Radio Access Network, NR, Release 18, 3GPP TS 38.214 V18.1.0, Dec. 2023— 289 pages.

(Continued)

*Primary Examiner* — Eva Y Puente
(74) *Attorney, Agent, or Firm* — Jamie T. Nguyen

(57) ABSTRACT

Procedures, methods, architectures, apparatuses, systems, devices, and computer program products for faster beam switching in a wireless network. A wireless transmit/receive unit (WTRU) may receive configuration information including QCL relation information for TCI states. The WTRU may receive beam switching information indicating a first replacement RS beam is associated with a first variable RS beam. The WTRU may determine measurements using the first source RS beam which is associated with a set of RS beams, including the first variable RS beam, as a QCL source for a TCI state according to the QCL relation information. The WTRU may determine measurements using the first replacement RS beam. The WTRU may send, in response to the beam switching information, information indicating that the TCI state is updated to be associated with the first replacement RS beam as the QCL source for the first set of variable RS beams based on the measurements.

20 Claims, 12 Drawing Sheets

100

(51) Int. Cl.
    *H04W 72/044*         (2023.01)
    *H04W 72/23*          (2023.01)

(58) Field of Classification Search
    CPC .. H04B 7/0626; H04B 7/06968; H04B 7/024;
           H04L 5/0048; H04L 5/0053; H04L
           5/0023; H04L 5/0051; H04L 5/0094;
         H04L 5/001; H04L 5/0091; H04L 5/005;
           H04L 5/0044; H04L 5/0035; H04L
           5/0057; H04L 5/00; H04L 5/0098; H04W
           72/23; H04W 72/046; H04W 24/08;
           H04W 24/10; H04W 16/28; H04W 76/19;
           H04W 72/21; H04W 72/0446; H04W
           74/0833; H04W 72/231; H04W 72/232;
                          H04W 72/1273
    See application file for complete search history.

(56)             References Cited

U.S. PATENT DOCUMENTS

| | | | |
|---|---|---|---|
| 2022/0232544 A1* | 7/2022 | Bai | H04W 72/046 |
| 2023/0284045 A1 | 9/2023 | Go et al. | |
| 2023/0328830 A1 | 10/2023 | Yi et al. | |
| 2024/0014880 A1* | 1/2024 | Svedman | H04B 7/06968 |
| 2024/0031825 A1* | 1/2024 | Sakhnini | H04W 72/23 |
| 2025/0007679 A1* | 1/2025 | Matsumura | H04W 16/28 |
| 2025/0175963 A1* | 5/2025 | Wang | H04B 7/06964 |
| 2025/0192934 A1* | 6/2025 | Varatharaajan | H04L 5/0044 |
| 2025/0274180 A1* | 8/2025 | Lim | H04W 72/23 |
| 2025/0330855 A1* | 10/2025 | Li | H04B 7/06952 |

OTHER PUBLICATIONS

Third Generation Partnership Project (3GPP), "Physical Layer Procedures for Control", Technical Specification Group Radio Access Network, NR, Release 18, 3GPP TS 38.213 v18.1.0, Dec. 2023—298 pages.

Intel Corp., "Enhancements to Multi-Beam Operation", 3GPP Tdoc R1-2104888, 3GPP TSG RAN WG1 #105-e e-Meeting, May 19-27, 2021, 27 pages.

* cited by examiner

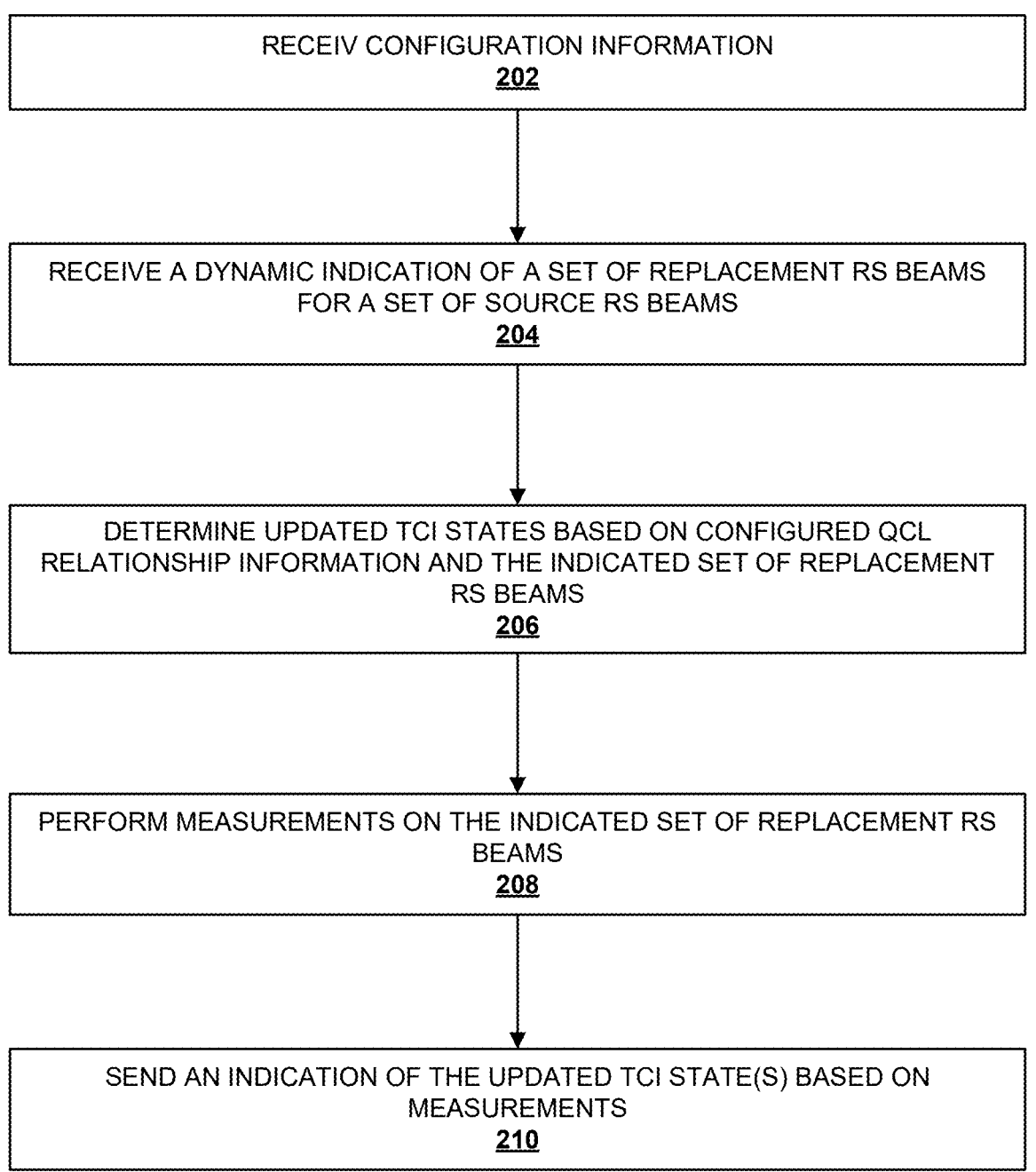

RECEIV CONFIGURATION INFORMATION
202

RECEIVE A DYNAMIC INDICATION OF A SET OF REPLACEMENT RS BEAMS
FOR A SET OF SOURCE RS BEAMS
204

DETERMINE UPDATED TCI STATES BASED ON CONFIGURED QCL
RELATIONSHIP INFORMATION AND THE INDICATED SET OF REPLACEMENT
RS BEAMS
206

PERFORM MEASUREMENTS ON THE INDICATED SET OF REPLACEMENT RS
BEAMS
208

SEND AN INDICATION OF THE UPDATED TCI STATE(S) BASED ON
MEASUREMENTS
210

FIG. 2

Figure 3:
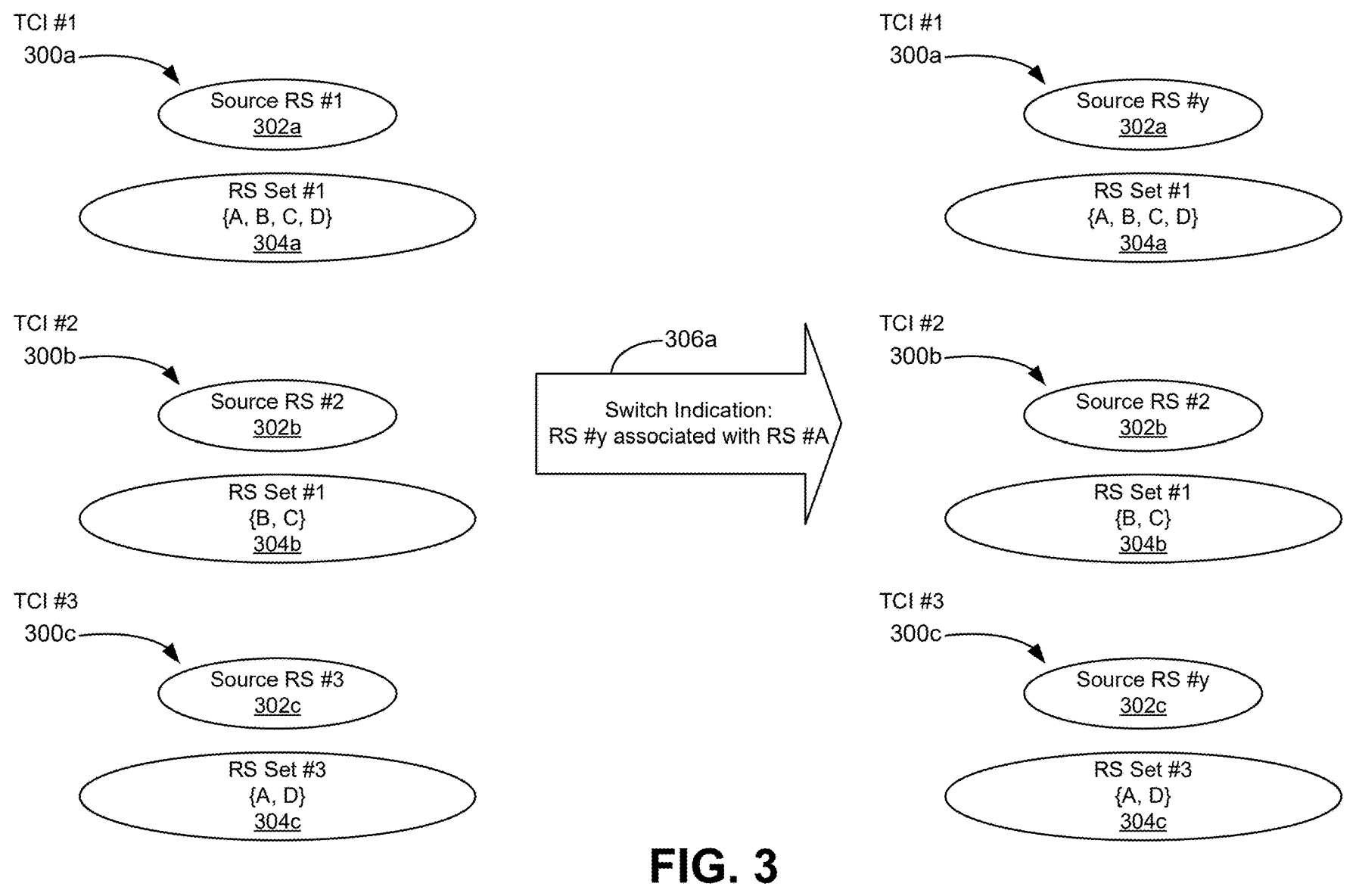

TCI #1
300a

Source RS #y
302a

RS Set #1
{A, B, C, D}
304a

TCI #2
300b

Source RS #2
302b

RS Set #1
{B, C}
304b

TCI #3
300c

Source RS #y
302c

RS Set #3
{A, D}
304c

306a

Switch Indication:
RS #y associated with RS #A

TCI #1
300a

Source RS #1
302a

RS Set #1
{A, B, C, D}
304a

TCI #2
300b

Source RS #2
302b

RS Set #1
{B, C}
304b

TCI #3
300c

Source RS #3
302c

RS Set #3
{A, D}
304c

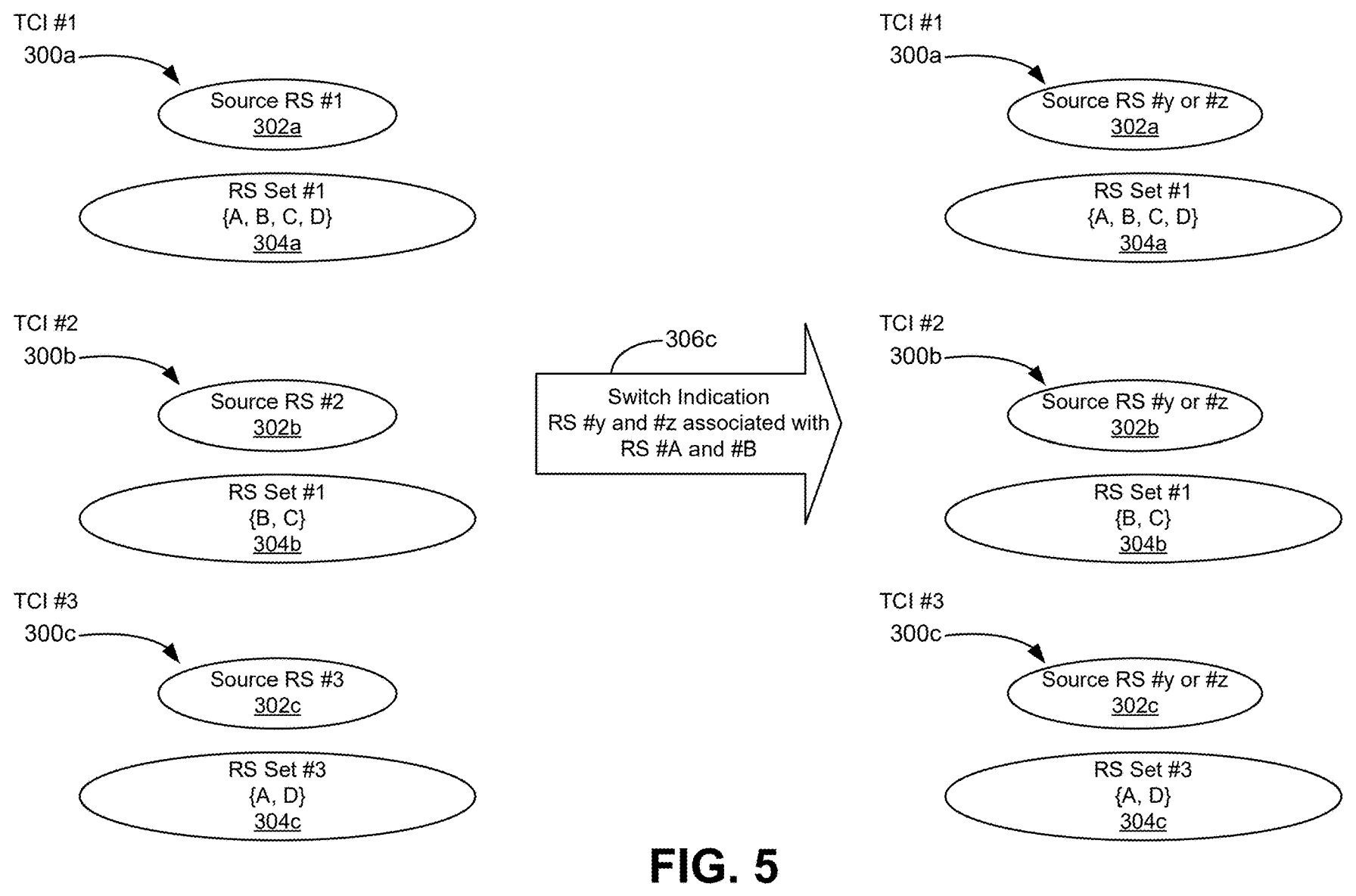

TCI #1
300a

Source RS #y or #z
302a

RS Set #1
{A, B, C, D}
304a

TCI #2
300b

Source RS #y or #z
302b

RS Set #1
{B, C}
304b

TCI #3
300c

Source RS #y or #z
302c

RS Set #3
{A, D}
304c

306c

Switch Indication
RS #y and #z associated with
RS #A and #B

TCI #1
300a

Source RS #1
302a

RS Set #1
{A, B, C, D}
304a

TCI #2
300b

Source RS #2
302b

RS Set #1
{B, C}
304b

TCI #3
300c

Source RS #3
302c

RS Set #3
{A, D}
304c

FIG. 5

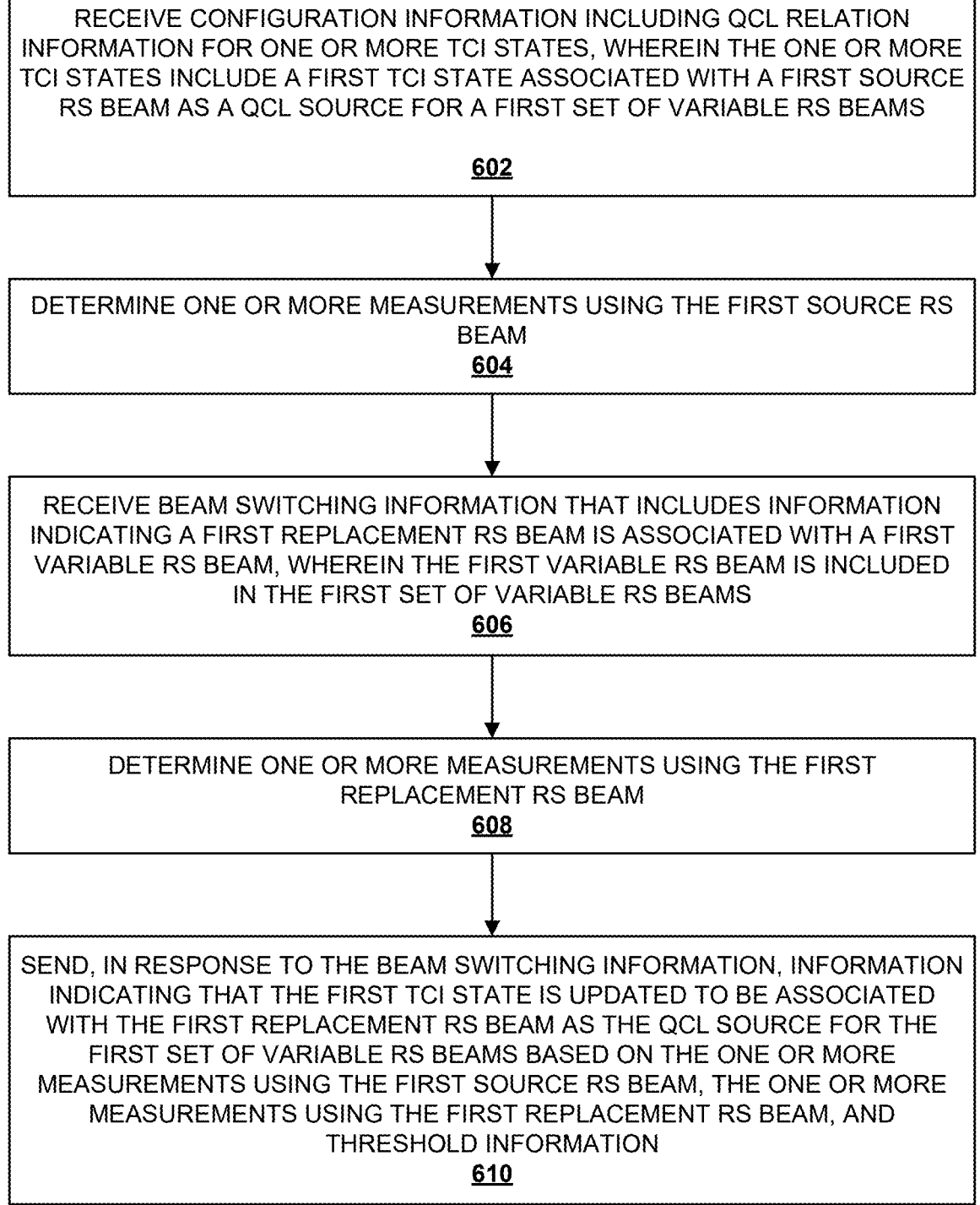

RECEIVE CONFIGURATION INFORMATION INCLUDING QCL RELATION INFORMATION FOR ONE OR MORE TCI STATES, WHEREIN THE ONE OR MORE TCI STATES INCLUDE A FIRST TCI STATE ASSOCIATED WITH A FIRST SOURCE RS BEAM AS A QCL SOURCE FOR A FIRST SET OF VARIABLE RS BEAMS

602

DETERMINE ONE OR MORE MEASUREMENTS USING THE FIRST SOURCE RS BEAM

604

RECEIVE BEAM SWITCHING INFORMATION THAT INCLUDES INFORMATION INDICATING A FIRST REPLACEMENT RS BEAM IS ASSOCIATED WITH A FIRST VARIABLE RS BEAM, WHEREIN THE FIRST VARIABLE RS BEAM IS INCLUDED IN THE FIRST SET OF VARIABLE RS BEAMS

606

DETERMINE ONE OR MORE MEASUREMENTS USING THE FIRST REPLACEMENT RS BEAM

608

SEND, IN RESPONSE TO THE BEAM SWITCHING INFORMATION, INFORMATION INDICATING THAT THE FIRST TCI STATE IS UPDATED TO BE ASSOCIATED WITH THE FIRST REPLACEMENT RS BEAM AS THE QCL SOURCE FOR THE FIRST SET OF VARIABLE RS BEAMS BASED ON THE ONE OR MORE MEASUREMENTS USING THE FIRST SOURCE RS BEAM, THE ONE OR MORE MEASUREMENTS USING THE FIRST REPLACEMENT RS BEAM, AND THRESHOLD INFORMATION

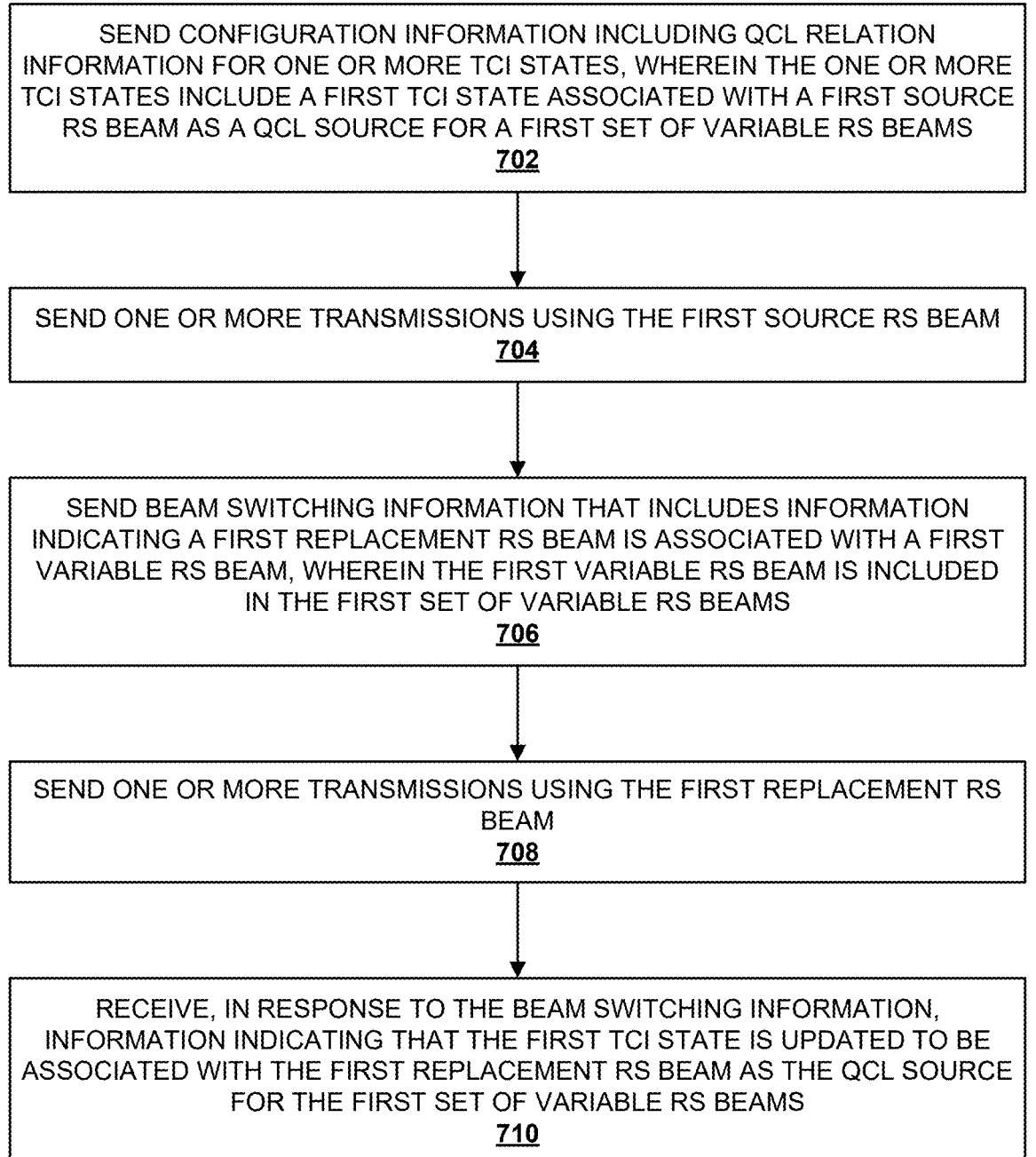

SEND CONFIGURATION INFORMATION INCLUDING QCL RELATION INFORMATION FOR ONE OR MORE TCI STATES, WHEREIN THE ONE OR MORE TCI STATES INCLUDE A FIRST TCI STATE ASSOCIATED WITH A FIRST SOURCE RS BEAM AS A QCL SOURCE FOR A FIRST SET OF VARIABLE RS BEAMS
702

SEND ONE OR MORE TRANSMISSIONS USING THE FIRST SOURCE RS BEAM
704

SEND BEAM SWITCHING INFORMATION THAT INCLUDES INFORMATION INDICATING A FIRST REPLACEMENT RS BEAM IS ASSOCIATED WITH A FIRST VARIABLE RS BEAM, WHEREIN THE FIRST VARIABLE RS BEAM IS INCLUDED IN THE FIRST SET OF VARIABLE RS BEAMS
706

SEND ONE OR MORE TRANSMISSIONS USING THE FIRST REPLACEMENT RS BEAM
708

RECEIVE, IN RESPONSE TO THE BEAM SWITCHING INFORMATION, INFORMATION INDICATING THAT THE FIRST TCI STATE IS UPDATED TO BE ASSOCIATED WITH THE FIRST REPLACEMENT RS BEAM AS THE QCL SOURCE FOR THE FIRST SET OF VARIABLE RS BEAMS
710

FIG. 7

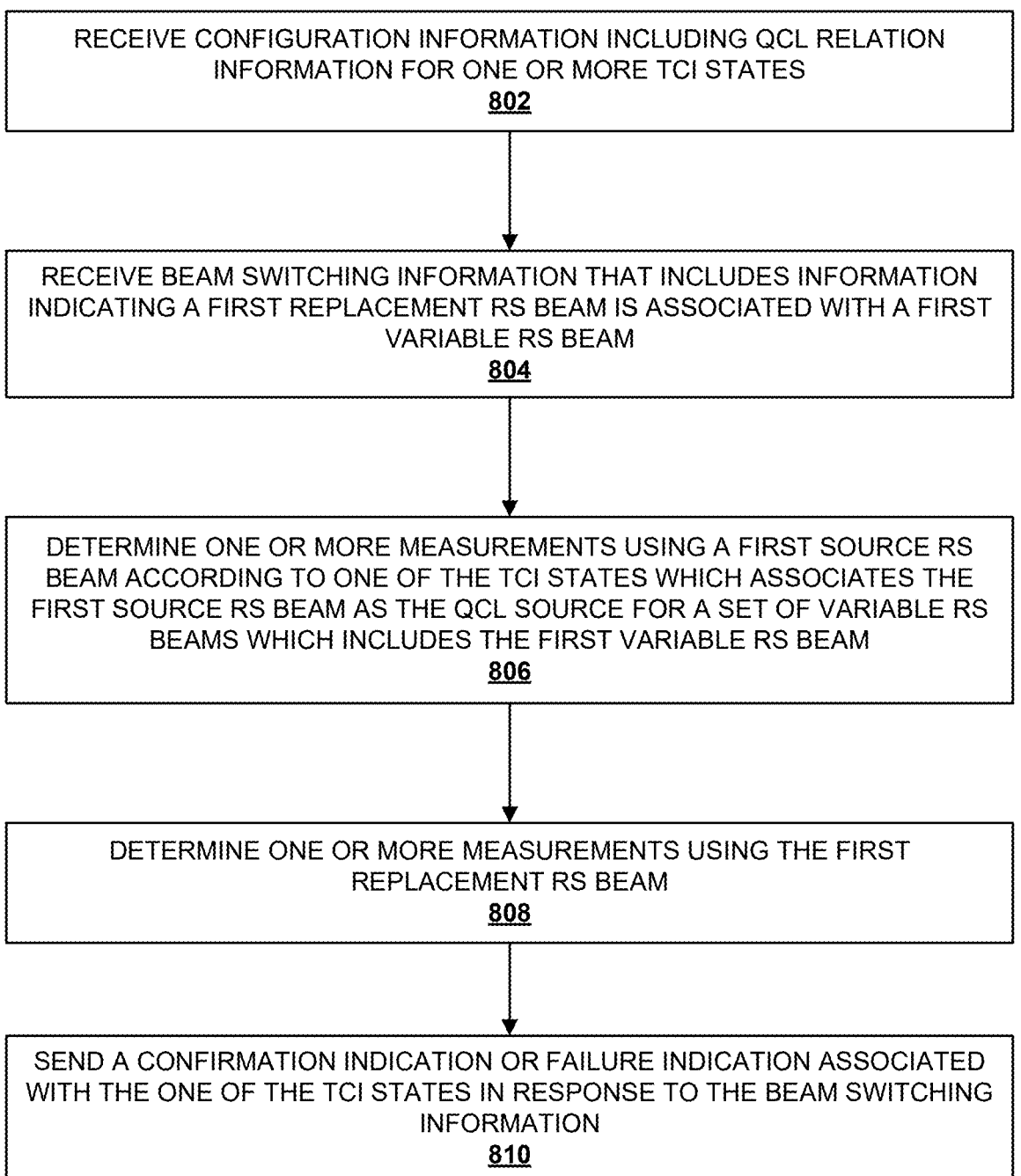

RECEIVE CONFIGURATION INFORMATION INCLUDING QCL RELATION INFORMATION FOR ONE OR MORE TCI STATES
<u>802</u>

RECEIVE BEAM SWITCHING INFORMATION THAT INCLUDES INFORMATION INDICATING A FIRST REPLACEMENT RS BEAM IS ASSOCIATED WITH A FIRST VARIABLE RS BEAM
<u>804</u>

DETERMINE ONE OR MORE MEASUREMENTS USING A FIRST SOURCE RS BEAM ACCORDING TO ONE OF THE TCI STATES WHICH ASSOCIATES THE FIRST SOURCE RS BEAM AS THE QCL SOURCE FOR A SET OF VARIABLE RS BEAMS WHICH INCLUDES THE FIRST VARIABLE RS BEAM
<u>806</u>

DETERMINE ONE OR MORE MEASUREMENTS USING THE FIRST REPLACEMENT RS BEAM
<u>808</u>

SEND A CONFIRMATION INDICATION OR FAILURE INDICATION ASSOCIATED WITH THE ONE OF THE TCI STATES IN RESPONSE TO THE BEAM SWITCHING INFORMATION
<u>810</u>

FIG. 8

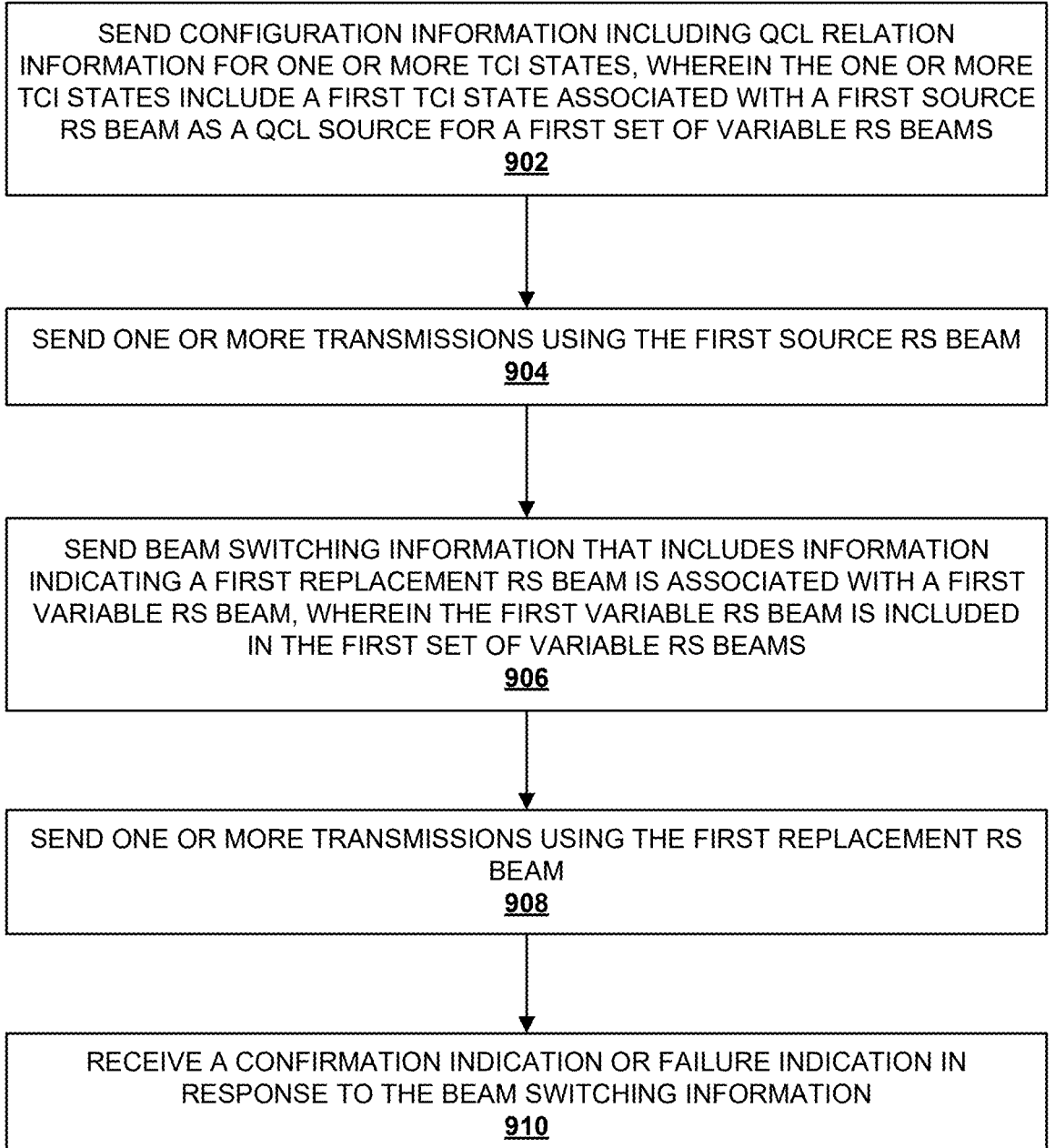

SEND CONFIGURATION INFORMATION INCLUDING QCL RELATION INFORMATION FOR ONE OR MORE TCI STATES, WHEREIN THE ONE OR MORE TCI STATES INCLUDE A FIRST TCI STATE ASSOCIATED WITH A FIRST SOURCE RS BEAM AS A QCL SOURCE FOR A FIRST SET OF VARIABLE RS BEAMS
902

SEND ONE OR MORE TRANSMISSIONS USING THE FIRST SOURCE RS BEAM
904

SEND BEAM SWITCHING INFORMATION THAT INCLUDES INFORMATION INDICATING A FIRST REPLACEMENT RS BEAM IS ASSOCIATED WITH A FIRST VARIABLE RS BEAM, WHEREIN THE FIRST VARIABLE RS BEAM IS INCLUDED IN THE FIRST SET OF VARIABLE RS BEAMS
906

SEND ONE OR MORE TRANSMISSIONS USING THE FIRST REPLACEMENT RS BEAM
908

RECEIVE A CONFIRMATION INDICATION OR FAILURE INDICATION IN RESPONSE TO THE BEAM SWITCHING INFORMATION
910

FIG. 9

METHODS, ARCHITECTURES, APPARATUSES AND SYSTEMS FOR ENABLING FAST BEAM SWITCHING

BACKGROUND

The present application is related to the fields of communications, software and encoding, including, for example, to methods, architectures, apparatuses, systems directed to network (NW) energy savings, user equipment (UE) power savings, beam switching, and radio link monitoring.

Current 5G New Radio (NR) standards enable the network to minimize its energy consumption due to transmissions and receptions. Such network energy savings (NES) capabilities include performing adaptations in multiple domains including (i) the spatial domain, such as powering off subsets of antenna ports, elements or panels, (ii) the time domain, such as applying cell discontinuous transmission (DTX), discontinuous reception (DRX), or applying long periodicity for SSB transmissions, (iii) the frequency domain, such as disabling certain carriers or bandwidth parts (BWPs), or (iv) the power domain, such as applying lower power offset values. Improved beam switching procedures may enable improvements in network energy savings and/or UE power savings. For example, it may be beneficial to improve flexibility at the NW to switch on and/or off synchronization signal block (SSB) beams for energy savings. For example, it may be beneficial to avoid interruptions at the UE when dynamically changing SSBs and/or Quasi-Colocated (QCL) sources. Embodiments described herein have been designed with the foregoing in mind.

BRIEF SUMMARY

Briefly stated, in one embodiment, a wireless transmit/receive unit (WTRU) may receive configuration information including QCL relation information for one or more (e.g., a set of) TC1 states. For example, the one or more TCI states may include a first TCI state associated with a first source RS beam as a QCL source for a first set of variable RS beams. The WTRU may determine one or more measurements using the first source RS beam. The WTRU may receive beam switching information that includes information indicating a first replacement RS beam is associated with a first variable RS beam. For example, the first variable RS beam may be included in (e.g., is one of) the first set of variable RS beams. The WTRU may determine one or more measurements using the first replacement RS beam. The WTRU may send, in response to the beam switching information, information indicating that the first TCI state is updated to be associated with the first replacement RS beam as the QCL source for the first set of variable RS beams. For example, the WTRU may (e.g., determine to) update the first TCI state based on the one or more measurements using the first source RS beam, the one or more measurements using the first replacement RS beam, and threshold information (e.g., using thresholds as described herein).

In one embodiment, a network node may send configuration information including QCL relation information for one or more TCI states. The one or more TCI states may include a first TCI state associated with a first source RS beam as a QCL source for a first set of variable RS beams. The network node may send one or more transmissions using the first source RS beam (e.g., which are measured by a WTRU). The network node may send beam switching information that includes information indicating a first replacement RS beam is associated with a first variable RS beam. For example, the first variable RS beam may be included in (e.g., is one of) the first set of variable RS beams. The network node may send one or more transmissions using the first replacement RS beam (e.g., for measurement by a WTRU). The network node may receive, in response to the beam switching information, information indicating that the first TCI state is updated (e.g., at a WTRU) to be associated with the first replacement RS beam as the QCL source for the first set of variable RS beams.

In one embodiment, a WTRU may receive configuration information including QCL relation information for one or more TCI states. For example, the one or more TCI states include a first TCI state associated with a first source RS beam as a QCL source for a set of variable RS beams. The WTRU may receive beam switching information that includes information indicating a first replacement RS beam is associated with a first variable RS beam. The WTRU may determine one or more measurements using a first source RS beam according to one of the TCI states which associates the first source RS beam as the QCL source for a set of variable RS beams which includes the first variable RS beam. The WTRU may determine one or more measurements using the first replacement RS beam. The WTRU may send a confirmation indication or failure indication associated with the one of the TCI states in response to the beam switching information.

In one embodiment, a network node may send configuration information including QCL relation information for one or more TCI states. For example, the one or more TCI states include a first TCI state associated with a first source RS beam as a QCL source for a first set of variable RS beams. The network node may send one or more transmissions using the first source RS beam. The network node may send beam switching information that includes information indicating a first replacement RS beam is associated with a first variable RS beam. For example, the first variable RS beam may be included in the first set of variable RS beams. The network node may send one or more transmissions using the first replacement RS beam. The network node may receive a confirmation indication or failure indication (e.g., associated with at least one of the TCI states) in response to the beam switching information. For example, the confirmation indication and the failure indication may be indicative of whether a WTRU was able to update at least one of the TCI states based on the beam switching information and the QCL relation information with which the WTRU was configured.

In one embodiment, a WTRU may determine replacement RS beams during a (e.g., fast) beam switching procedure. The WTRU may be configured with one or more parameters associated with determining one or more replacement RS beams. The WTRU may receive an indication associated with RS beam switching. The WTRU may take associated actions and/or perform associated behaviors upon receiving the indication associated with RS beam switching.

In one embodiment, a WTRU may enable radio link management during a (e.g., fast) beam switching procedure. The WTRU may be configured with a set of RS beams and one or more parameters associated with RLM. The WTRU may perform a radio link failure (RLF) detection procedure during RS beam switching. The WTRU may perform radio link recovery procedure during RS beam switching.

BRIEF DESCRIPTION OF THE DRAWINGS

The following detailed description will be better understood when read in conjunction with the appended drawings, in which there are shown examples of one or more of the multiple embodiments of the present disclosure. It should be understood, however, that the embodiments described herein are not limited to the precise arrangements and instrumentalities shown in the drawings. In the drawings:

FIG. 2 is a flow diagram illustrating an example procedure to update a set of RS beams, according to one or more embodiments of the present disclosure;

FIG. 3 is a configuration diagram illustrating an example of updating TCI state(s), according to one or more embodiments of the present disclosure;

FIG. 4 is another configuration diagram illustrating an example of updating TCI state(s), according to one or more embodiments of the present disclosure;

FIG. 5 is another configuration diagram illustrating an example of updating TCI state(s), according to one or more embodiments of the present disclosure;

FIG. 6 is a flow diagram illustrating an example procedure of updating TCI state(s), according to one or more embodiments of the present disclosure;

FIG. 7 is a flow diagram illustrating another example procedure of updating TCI state(s), according to one or more embodiments of the present disclosure;

FIG. 8 is a flow diagram illustrating another example procedure of updating TCI state(s), according to one or more embodiments of the present disclosure; and FIG. 9 is a flow diagram illustrating another example procedure of updating TCI state(s), according to one or more embodiments of the present disclosure.

DETAILED DESCRIPTION

Figure 1A:
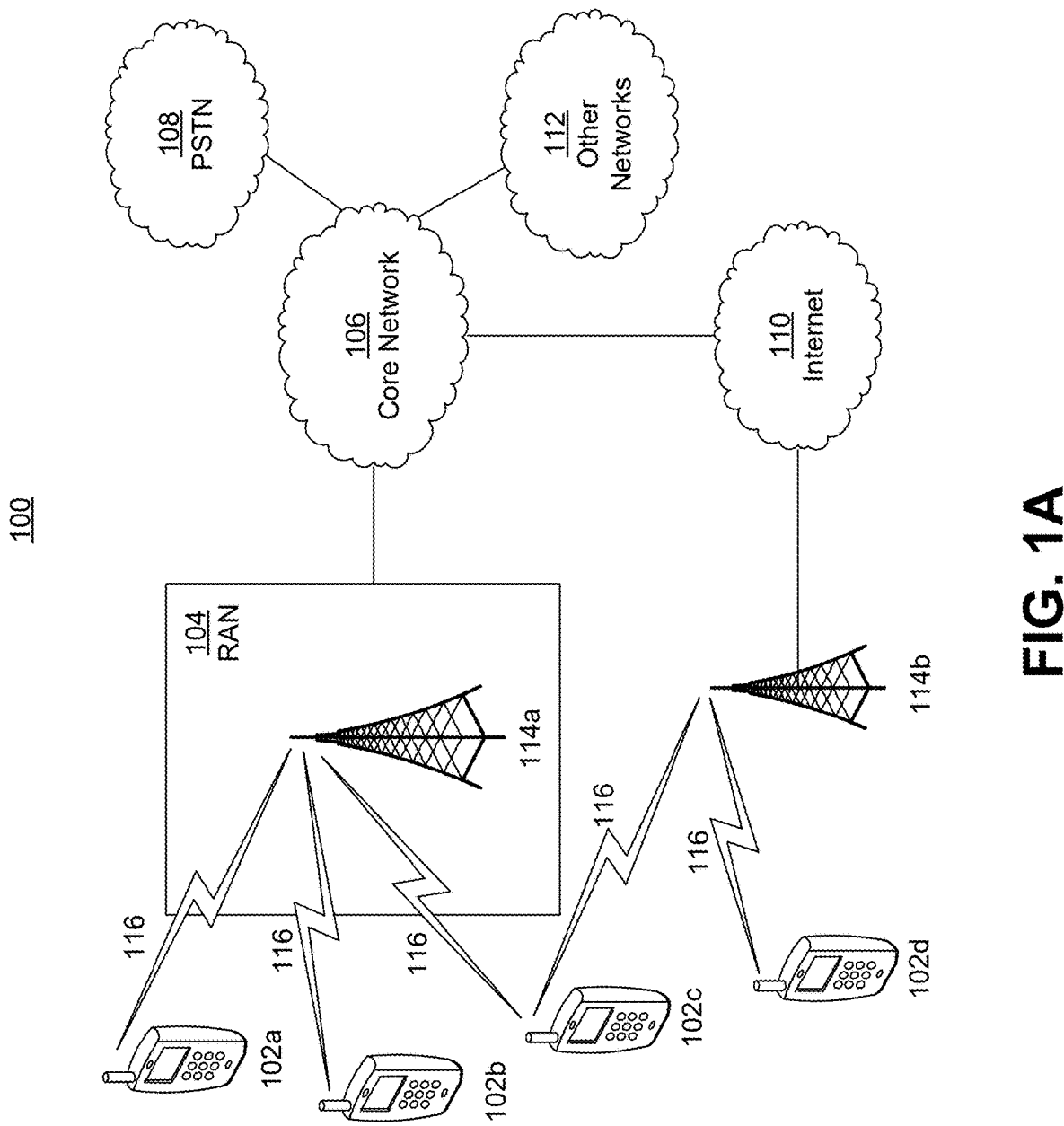
FIG. 1A is a system diagram illustrating an example communications system, according to one or more embodiments of the present disclosure.

In describing the various embodiments of the present disclosure, certain terminology is used herein for convenience only and should not be considered as limiting such embodiments. In the drawings, the same reference numerals are employed for designating the same elements throughout the several figures and the present description.

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
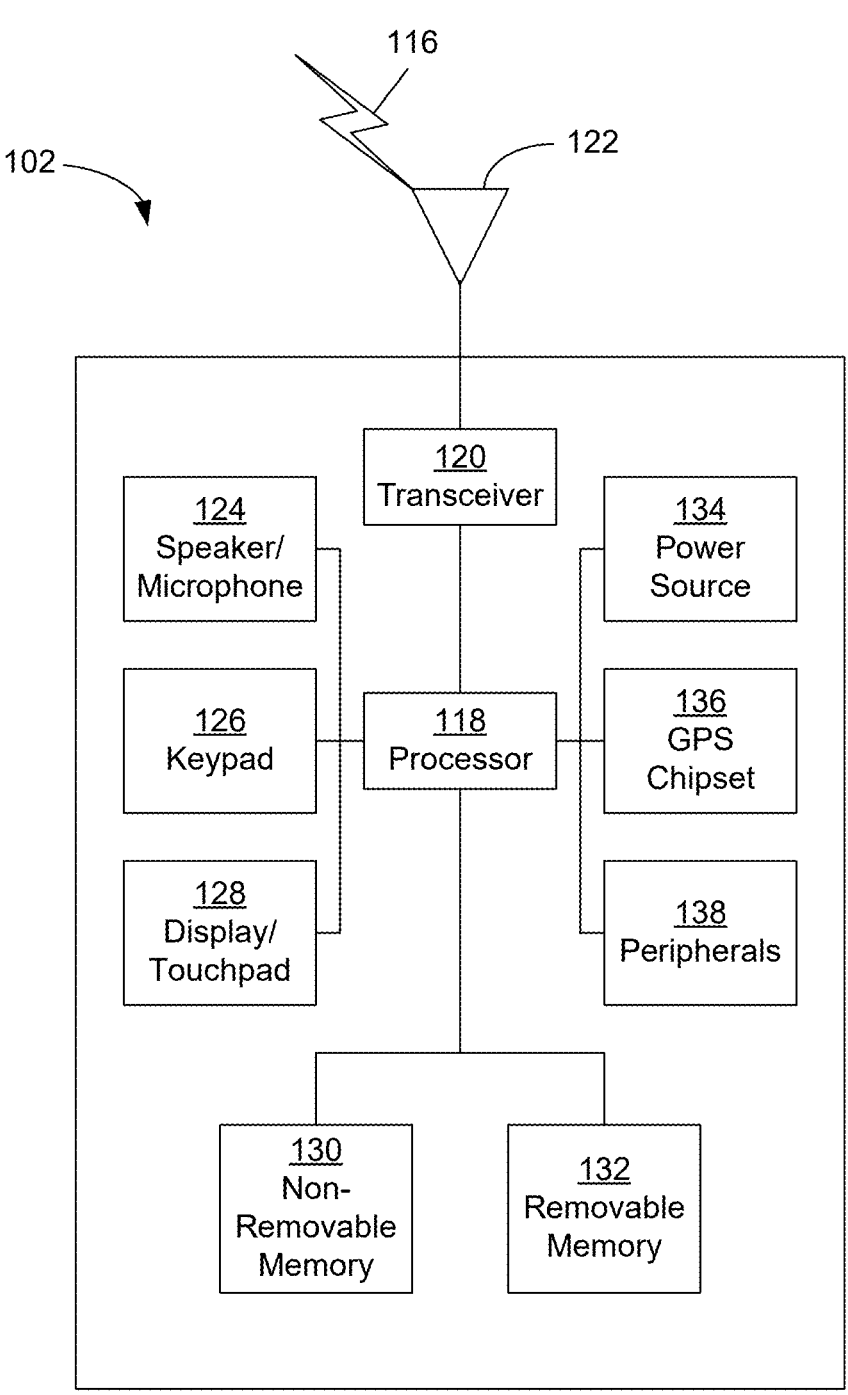
FIG. 1B is a system diagram illustrating an example wireless transmit/receive unit (WTRU) that may be used within the communications system illustrated in FIG. 1A, according to one or more embodiments of the present disclosure.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
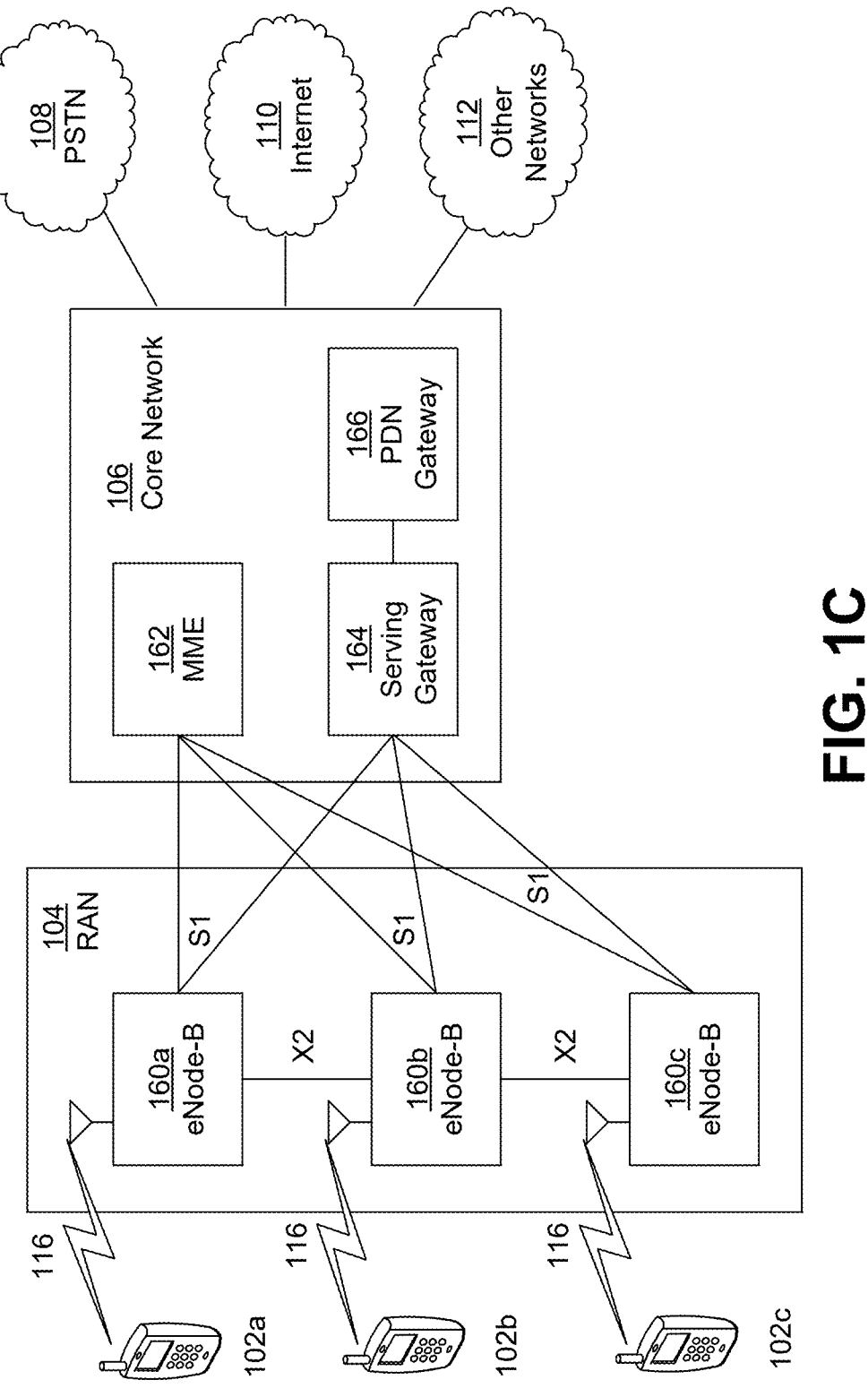
FIG. 1C is a system diagram illustrating an example radio access network (RAN) and an example core network (CN) that may be used within the communications system illustrated in FIG. 1A, according to one or more embodiments of the present disclosure.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHZ to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
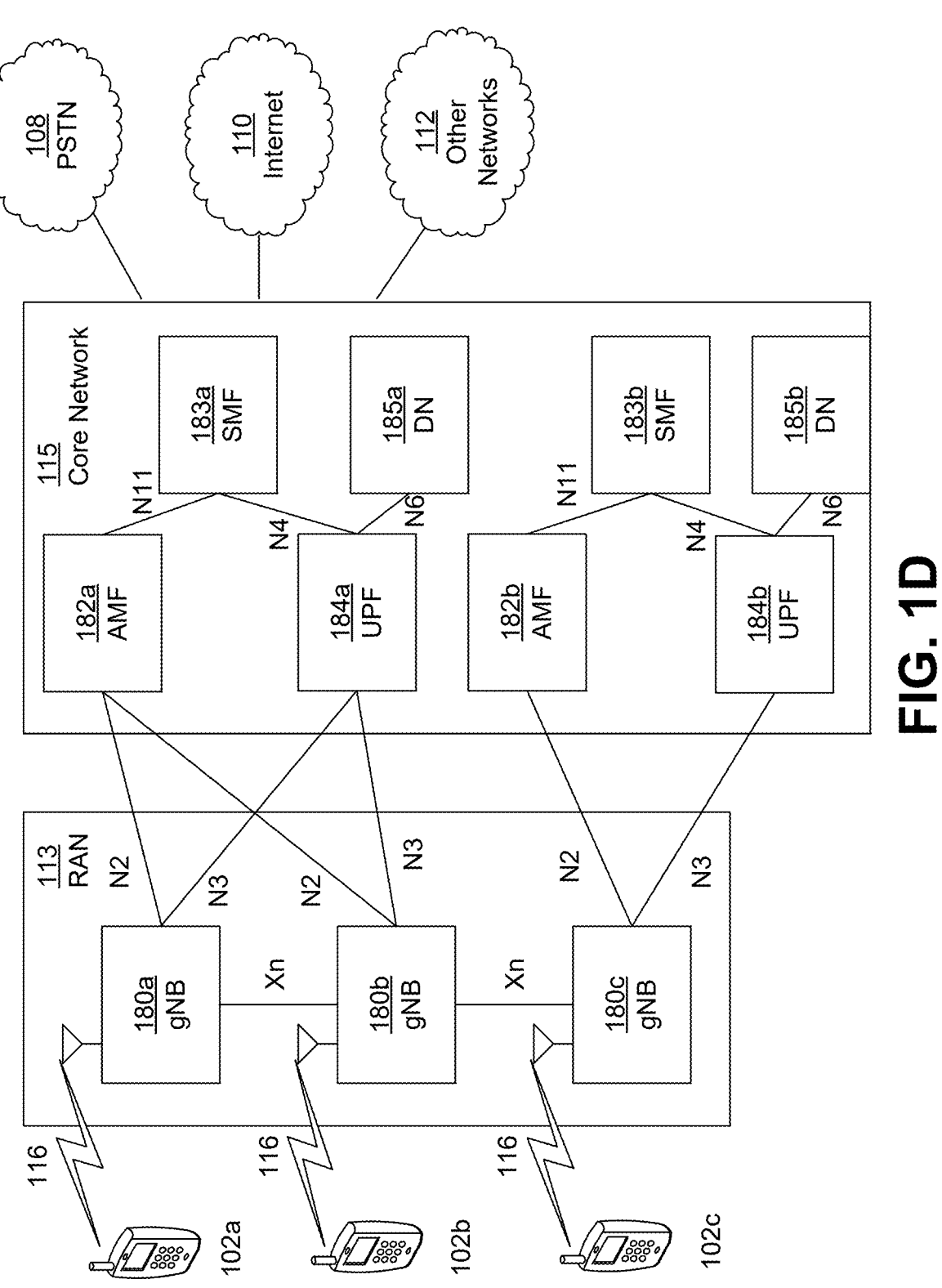
FIG. 1D is a system diagram illustrating a further example RAN and a further example CN that may be used within the communications system illustrated in FIG. 1A, according to one or more embodiments of the present disclosure.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG.

1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

While NES enhancements supported in 5G NR Release 18 are specified with the assumption that the NW is lightly or moderately loaded in terms of achievable throughput by the WTRUs in cells, future releases or generations of 3GPP standards are expected to support more advanced capabilities and features for NES, even in high load scenarios. In high load scenarios, the NW is assumed to be active most of the time, such as where transmissions and receptions occur when the load level is at least 75%. Both the DL and UL traffic is expected to have a high degree of dynamism. For improving NES gains in high load scenarios, the NW nodes may be expected to quickly transition to an NES mode after using high load capabilities (e.g., a high number of antenna elements/ports, multiple transmission layers and/or carriers). In essence, there needs to be faster adaptation at the NW, such that any switching on and/or off of reference signals (e.g., SSBs) may be done as fast as possible and enable the NW nodes to operate in dormant and/or NES modes much longer.

For example, when operating in an NES mode, it may be assumed that cells may dynamically switch on and/or off at least a subset of SSB beams (e.g., during low load conditions for energy savings). As an example, given a set of 3 narrow beam SSBs in a burst represented as {SSB2, SSB3, SSB4}, the NW may switch off SSB2 and SSB4 and replace them with one wide-beam SSB3. As the narrow-beams SSB2 and SSB4 may be considered to be within the beamwidth of SSB3, the wide-beam SSB3 may replace SSB2/SSB4 as a Quasi-Colocation (QCL) source.

For example, it may be assumed that a WTRU 102 (e.g., in CONNECTED and/or IDLE mode) may be configured with at least one narrow-beam SSB as a QCL source for a target channel (e.g. DMRS PDSCH).

In certain representative embodiments, a WTRU 102 may (e.g., be expected to) determine whether a replacement RS beam may replace an existing RS beam (e.g. as a QCL source), such as before the existing RS beam is switched off. In certain representative embodiments, a WTRU 102 may (e.g., be expected to) fallback to an RS beam when a replacement RS beam is (e.g., determined as) not being suitable.

In certain representative embodiments, the dynamic switching on and/or off of a set of RS beams may be taken into consideration that (e.g., typically) serve as QCL sources for multiple target signals and/or channel signals (e.g. DMRS-PDCCH, DMRS-PDSCH, SRS).

In certain representative embodiments, the (e.g., dynamic) transitioning from an existing set of RS beams to a set of replacement RS beams may be optimized for NES with minimal impact to QCL relations and associated target channels.

In 5G NR Release 18 NES, the enhancements specified (e.g., cell DTX/DRX operation, CSI-RS framework for spatial and power domain adaptations) do not impact the transmission of SSBs. The SSBs are transmitted with legacy parameters to avoid any impacts to legacy WTRUs.

In 5G NR Release 19 NES, the adaptations to SSBs considered are related to adapting the periodicity of SSB transmission. Such adaptations are also designed to be done semi-statically and with the aim of avoiding any impacts to legacy WTRUs. Further, such adaptation is collective for all SSBs (e.g., all on or all muted).

For realizing high NES gains, it may be beneficial for the always-on SSBs to be quickly powered on and/or off. For example, narrow beams may be quickly replaced with wide beams when switching off some associated antenna ports and/or elements at a transmission/reception point (TRP).

In 6G, transmissions of SSBs may be adapted more dynamically (e.g., at the symbol-level) and/or gradually for realizing greater energy savings without the restriction to avoiding legacy WTRU 102 impacts.

In certain representative embodiments, existing RS and/or SSB beams (e.g., used as QCL sources) can be dynamically replaced with alternative RS and/or SSB beams that are optimized for NES, such as without having to reconfigure the QCL relations between beams.

Overview

FIG. 2 is a flow diagram illustrating an example procedure to update a set of RS beams.

In certain representative embodiments, a WTRU 102 may determine to update a set of (e.g., one or more) RS beams (e.g., configured as QCL sources) with a set of replacement RS beams based on an (e.g., dynamic) indication on the replacement RS beams and (pre) configured QCL relationship information.

As shown in FIG. 2, a WTRU 102 may receive configuration information at 202. For example, the configuration information may include QCL relationship information for one or more TCI states indicating the association between a set of (e.g., one or more) source RS beams and a set of (e.g., variable) RS beams.

As an example, the TCI states may include any of: (i) a first TCI state 'TCI1' where a first source RS 'RS1' is associated with a first set of RSs {A, B, C, D}; (ii) a second TCI state 'TCI2' where a second source RS 'RS2' is associated with a second set of RSs {B, C}; and/or (iii) a third TCI state 'TCI3' where a third source RS 'RS3' is associated with a third set of RSs {A, D}.

In the example above, for the first TCI state 'TCI1' any of the variable RS beams in the set with indexes {A, B, C, D} may be associated with the first source RS beam 'RS1'. In the example above, the RS beams may correspond to (e.g., include) any of SSB and/or CSI-RS beams.

As another example, (e.g., each) of the TCI states may include an RS beam that may correspond to any of the RS beams in the set. For example, the first TCI state 'TCI1' may include an RS 'RSx' that is associated with a set of RSs (e.g., {A, B, C, D}).

At 204, the WTRU 102 may receive a dynamic indication of a set of replacement RS beams for a set of source RS beams. For example, the indication may indicate a variable RS beam with an index 'A' is replaced by an RS beam with an index 'y'. For example, the indication may indicate the source RS set (e.g., source RS beams, SSB type "legacy") is replaced by a replacement RS set (e.g., replacement and/or different RS beams, SSB type "new" or "6G"). For example, the indication may include an application time, such as indicating the timing information for when the replacement RS beams may be expected and/or received. For example, the indication may be received in any of a Layer 2 (L2) MAC control element (CE) and/or Layer 1 (L1) downlink control information (DCI) signaling.

At 206, the WTRU 102 may determine updated (e.g., to update) TCI states based on the configured QCL relation information and the indication of the replacement RS beams. For example, the WTRU 102 may update the following TCI states such that, for the first TCI state 'TCI1', a RS 'RSy' replaces a RS 'RS1', and for the third TCI state 'TCI3', the RS 'RSy' replaces a RS 'RS3'.

At 208, the WTRU 102 may perform measurements on the indicated set of replacement RS beams (e.g., 'RSy'). At 210, the WTRU 102 may send an indication of (e.g., confirming) the updated TCI state(s) based on the measurements (e.g., satisfying criteria). For example, the WTRU 102 may send a confirmation indication if the change in measurements is within a threshold value. As an example, a measured reference signal received power (RSRP) change between 'RS1' and 'RSy' may be within the threshold value and/or a measured RSRP change between RS3 and RSy may be within the threshold value. As other examples, other measurement thresholds may be used to determine whether the measurements satisfy certain one or more conditions and/or criteria.

Common Terminology and Concepts

The following terminology is used and may be assumed throughout the present disclosure.

The terms Synchronization Signal Block (SSB) and SS/PBCH block may be used interchangeably herein. A SSB may include at least one of the following: Primary Synchronization Signal (PSS), Secondary Synchronization Signal (SSS), Physical Broadcast Channel (PBCH) (e.g., Data, MIB, and/or DMRS). SSBs may be transmitted by a NW node (e.g., base station, TRP, relay node, RIS unit) in different directions as beams. The number of SSB beams in an SSB burst set may be transmitted periodically within an interval (e.g., 5 ms) and/or may depend on the carrier frequency. For example, an SSB burst may contain 4 SSBs for FR1 (<3 GHZ), 8 SSBs for FR1 (3 to 6 GHZ) and 64

SSBs for FR2. Certain (e.g., predetermined) SSBs may be transmitted as on-demand SSBs (OD-SSBs), such as may include a subset of SSBs in a burst. OD-SSBs may be transmitted aperiodically, semi-persistently, or periodically with a certain periodicity. The transmission of such OD-SSBs may be triggered by the NW node or WTRU 102 (e.g., via transmission of an UL wake-up signal (WUS)). For example, SSBs may include slim and/or lean SSBs, which may include PSS only, PSS and SSS-only, or PBCH or a subset of MIB-only.

The term channel state information reference signal (CSI-RS) may be used herein. CSI-RS may include (e.g., refer to) any of the following: CSI-RS resource set (e.g., ID), CSI-RS resource (e.g., ID/index), resource mapping, power control offset values (e.g., with respect to PDSCH, SSB), scrambling ID, periodicity, offset and/or QCL info. For example, a CSI-RS may be transmitted in the DL by a NW node as CSI-RS beams, such as via different resource types (e.g., periodic, semi-persistent and aperiodic).

The term channel state information (CSI) may be used herein. CSI may include any of the following: channel quality index (CQI), rank indicator (RI), precoding matrix index (PMI), an L1 channel measurement (e.g., RSRP, such as L1-RSRP, or SINR), CSI-RS resource indicator (CRI), SS/PBCH block resource indicator (SSBRI), layer indicator (L1) and/or any other measurement quantity measured by the WTRU 102 from the configured CSI-RS or SS/PBCH (SSB) block.

The term channel condition(s) may be used herein. Channel conditions may include any conditions relating to the state of the radio/channel. For example, channel conditions may be determined by the WTRU 102 from any of: a WTRU measurement (e.g., L1/SINR/RSRP, CQI/MCS, channel occupancy, RSSI, power headroom, exposure headroom), L3/mobility-based measurements (e.g., RSRP, RSRQ, s-measure), an RLM state, and/or channel availability in unlicensed spectrum (e.g., whether the channel is occupied based on determination of an LBT procedure or whether the channel is deemed to have experienced a consistent LBT failure).

The term property of scheduling information and scheduling property may be used interchangeably herein. A property of scheduling information (e.g., an uplink grant or a downlink assignment) may include any of the following: a frequency allocation; an aspect of time allocation, such as time instance or/and a time duration; a priority; a modulation and coding scheme (MCS); a transport block (TB) size; a number of spatial layers; a number of transport blocks to be carried; a TCI state or sounding reference signal resource indicator (SRI); a number of repetitions; a grant type (e.g., a configured grant (CG) may be type 1 such as where a WTRU 102 immediately uses the configured UL resources after receiving the configuration information, type 2 such as where a WTRU 102 waits until an explicit MAC CE indication is received before using the configured UL resources, or a dynamic grant).

The term indication may be used herein. For example, an indication by DCI, or an indication, may include any of the following: an explicit indication by a DCI field or by RNTI used to mask CRC of the PDCCH, an implicit indication by a property such as DCI format, DCI size, CORESET or search space, aggregation level, and/or an identity of a first control channel resource (e.g., index of first CCE) for a DCI, where the mapping between the property and the value may be signaled by RRC or MAC. For example, an explicit indication may be signaled by a DL MAC CE.

In certain representative embodiments, the network may include any of one or more base station(s), one or more core network function(s) (e.g., AMF, SMF, PCF, NEF), and/or one or more application function(s) (e.g., edge server function, remote server function). For example, a base station may refer to any of a gNB 180, a TRP, a RAN node, an access node, a non-terrestrial network (NTN) node, integrated access/backhaul (IAB) node, and/or a reconfigurable intelligent surface (RIS) unit and/or node). NES cells may refer to any of the network nodes that may be operating in an NES state/mode, including any of time, frequency, spatial and/or power domain adaptation modes.

In certain representative embodiments, NES adaptations may include any of the adaptations at the NW in the spatial domain (e.g., power off subsets of antenna ports, elements or panels), time domain (e.g. (de)activation of cell DTX/DRX, applying long periodicity or sparse transmissions of common signals/channels), frequency domain (e.g., disable certain carriers or BWPs) or power domain (e.g., apply lower power offset values).

For example, 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example'. A symbol '/' (e.g., forward slash) may be used herein to represent 'and/or', where for example, 'A/B' may imply 'A and/or B'.

Network Availability States/Cell DTX Mode/NES States/ NES Adaptations

In certain representative embodiments, a NES state or an availability state may refer to a cell state in which the cell, TRP or NW node has activated at least one NES technique, such as reduced SIB1 transmission (e.g., periodic or existence), reduced SSB transmission (e.g., periodic or existence), cell DTX, cell DRX, spatial domain adaptation (e.g., where a subset of antenna ports and/or elements are turned off), power domain adaptation (e.g., where a subset of channels are transmitted with reduced power or muted), triggering of SRS transmission with subset of resources, triggering of subset of TCI states, and/or the cell or TRP has turned off.

In certain representative embodiments, a WTRU 102 may determine whether it can transmit or receive on certain resources depending on a network availability state, which implies the gNB's power savings status. An availability state may correspond to a network energy savings state, a cell DTX mode, a cell DRX mode, and/or a gNB activity level. An availability state may be uplink or downlink specific, and may change from symbol to symbol, slot to slot, frame to frame, or on longer duration granularity. The availability state may be determined by the WTRU 102 or indicated by the network. An availability state can be, for example, "On", "DL and UL active", "UL only active", "off", "reduced Tx power", "dormant", "sleep (de)-activated", "micro sleep", "light sleep", "deep sleep", the active period of a sleep pattern, and/or the deactivate period of a sleep pattern. For example, in a sleep pattern, the active period may correspond to the time when the NW may actively transmit DL signals/channels and/or the time when the NW may blind decode for UL signals/channels. Such states can be abstracted by NW configuration parameters and/or values, and a dynamic indication may point to the active availability state (e.g., by DCI or MAC CE signaling). The "Off" availability state or the non-active period of a sleep pattern may imply that the gNB's baseband hardware is (e.g., completely) turned off. The "sleep" availability state may imply that the gNB wakes up periodically to transmit certain signals (e.g., presence signals, synchronization, and/or reference signals) and/or receive certain UL signals. In some availability states, some DL or UL resources may not be available during certain periods of time, and this enables the network to turn off baseband processing and other activities. For example, the WTRU 102 may be configured by RRC with periodic active and inactive periods per availability. Some measurement resources (e.g. SSBs and/or CSI-RS) may only be made available in certain availability states, including: RLM, BFD, RRM measurements, CSI-RS feedback configuration, and/or a different power offset for CSI feedback.

In certain representative embodiments, under certain conditions, the WTRU 102 may further transmit a request to the network (e.g., wake-up request) to modify the availability state to a state for which resources that would satisfy WTRU 102 requirements are available. For example, the WTRU 102 may determine an availability state from the reception of an availability state indication from L1 and/or L2 signaling (e.g., a group common DCI or indication), or implicitly determine it from the reception of periodic DL signaling or lack thereof.

In certain representative embodiments, a WTRU 102 may determine if a resource is available for transmission, reception and/or measurements for the determined network availability state if it is applicable in the active availability state. In certain representative embodiments, the WTRU 102 may (e.g., also) adapt its active C-DRX cycle, active spatial elements (e.g., antenna or logical ports), active TRPs, and/or paging occasions as a function of the signaled or determined availability state. The WTRU 102 may be configured with one or more sets of NES transmission and/or reception parameters per availability state, such as by broadcast or dedicated configuration signaling. The WTRU 102 may apply a NES parameter set according to the determined or signaled availability state. The WTRU 102 may apply one or more applicable configurations depending on the determined NES state. A set of NES parameter may include any of: a number of antenna ports, a C-DRX configuration, a measurement configuration (e.g., for RRM, RLM, and/or BFD), CSI feedback, a CSI-RS configuration, an SSB configuration, CHO or mobility candidates, and/or a set of active TRPs.

In certain representative embodiments, an availability state may be applicable to at least one transmission, reception, or measurement resource. An availability state may be applicable to at least one time period, such as a time slot or time symbol. An availability state may be applicable to a serving cell, a cell group, a frequency band, a bandwidth part, a TRP, a set of spatial elements, and/or a range of frequencies (e.g., within a bandwidth part). For example, when an NES state changes in a cell, the WTRU 102 may receive an availability state change indication indicating that this change is just for that cell, for all cells at the same frequency, and/or a same RAT.

In certain representative embodiments, a WTRU 102 may consider the active availability state associated with a cell, carrier, TRP, or frequency band to be "Off", "Deep sleep", or "Micro sleep" after reception of a DL signaling that changes the cell's or TRP's availability state. For example, the WTRU 102 may receive a turn off command on broadcast signaling, RRC signaling, DCI (e.g. a group common DCI), and/or a DL MAC CE (e.g., indication part of PDSCH). The WTRU 102 may determine an availability state from reception of an availability state indication from L1/L2 signaling (e.g., a group common DCI or indication) or broadcast signaling associated with an availability state.

For example, an availability state change indication may be part of S1 update or SIB signaling (e.g., in a separate SIB that is not read by legacy WTRUs). There may be a common time for all WTRUs in the cell to determine availability state status.

For example, a WTRU 102 may determine a change of NES state change from the reception of a group common command L1 signaling (e.g., a group common DCI, a multi-stage DCI, a specific DCI format, and/or a DCI scrambled by a configured or specified NES-specific RNTI). L1 signaling may indicate one of the configured NES parameters sets to apply or may determine a delta configuration from the current set of parameters upon determining an NES state change. The WTRU 102 may transmit feedback and/or acknowledgment to a gNB, such as multiplexed with UL data (e.g., part of an UL TB as a MAC CE or a sub-header indication), following the reception of a NES state change indication.

For example, a WTRU 102 may determine a change of NES state change from the reception of broadcast signaling associated with NES state indication or change, including signaling in SIB(s) or part of a broadcast or multicast PDSCH. The WTRU 102 may be indicated the NES state explicitly in the SIB. The WTRU 102 may be configured with one or more SIBs (e.g., exclusively) associated with a configuration of NES parameters. The WTRU 102 may be configured to receive such broadcast or multicast indication periodically. The WTRU 102 may determine an indication is mis-detected if not received on expected periodic occasions, if a number of misdetections is counted, and/or if a timer has elapsed since the last reception of the NES state indication. The WTRU 102 may start inter-cell, inter-frequency, and/or inter-RAT measurements, start a mobility procedure, and/or start evaluating configured conditional handover (CHO) candidates following the determination of a misdetection of the NES state indication.

In certain representative embodiments, a WTRU 102 may implicitly assume a certain availability state associated with a cell, carrier, TRP, and/or frequency band (e.g., "Off, "deep sleep", "micro sleep" or dormant") from any (e.g., combination) of the following.

For example, a WTRU 102 may assume an availability state based on reception of a command and/or signal indicating a change in availability state (e.g., a group common DCI in connected mode or RRC signaling or a presence signal). The WTRU 102 may determine an availability state implicitly from the reception of periodic DL signaling. The WTRU 102 may be configured or specified to associate an availability state with one or more DL signal types (e.g., SSB, partial SSB, and/or one or more periodicities).

For example, a WTRU 102 may assume an availability state based on reception of a paging message, paging DCI, paging PDSCH, and/or a paging related signal (e.g., PEI), possibly on a subset of POs (e.g., those aligned with NES DRX cycle or a configured subset of PDCCH resources). The WTRU 102 may assume a certain availability state after reception of an indication part of the DCI or PDCCH scheduling paging (e.g., as a function of the P-RNTI, NES-RNTI, and/or based on receiving an explicit indication, such as on a reserved bit). The WTRU 102 may assume a certain availability state after the reception of a paging message with a certain P-RNTI, a separately configured NES P-RNTI, or the NES group RNTI. The WTRU 102 may assume a certain availability state after the reception of a paging message with a certain P-RNTI. The WTRU 102 may be configured with one more PEI subgroup for NES, where a subgroup may be associated with one or more availability state. The WTRU 102 may assume a certain availability state after reception of a PEI with an NES subgroup, possibly if that subgroup is configured and/or associated with the availability state. The indication of the availability state or the availability state switch may be indicated in the paging payload, e.g., as a flag part of the paging message or the short message. Such paging indication may further indicate an alternative cell to monitor paging on while the cell from which the signaling was received is off, sleep, or in NES state. Such paging indication may further indicate or signal applicable reconfiguration parameters (e.g., for initial access, applicable PRACH resources, applicable SSB/RS occasions, applicable S1 cycle, and/or the applicable cell(s) and associated availability states).

For example, a WTRU 102 may assume an availability state based on reception of a TCI state indication, indicating the activation/deactivation or triggering of one or more TCI states. Such a TCI state may include information on QCL sources (e.g. SSB, on-demand SSB, slim/lean SSB, TRS, CSI-RS resource, SRS resource, PRS, SRSp), QCL types (e.g., information on doppler shift, doppler spread, delay spread, average delay, spatial Rx parameter), and/or spatial configuration information (e.g., parameters for UL Tx spatial filter).

For example, a WTRU 102 may assume an availability state based on a gNB DTX status (e.g., whether the gNB is in active time or an associated activity timer is running).

For example, a WTRU 102 may assume an availability state based on a lack of detection of a presence indication. A WTRU 102 may determine an availability state associated with the cell (e.g., "off" or "deep sleep") if a presence indication was not detected on one or more presence indication occasions. A WTRU 102 may assume or change the cell's availability state after a number of consecutive misdetections or after a timer expires following no detection of a presence signal. The WTRU 102 may determine an availability state is active or de-active after expiry of a timer associated with the availability state. Such a timer can be configured and/or maintained in connected mode only, or also in other states (e.g., idle and inactive states). A WTRU 102 may determine an availability state implicitly from the lack of reception of periodic DL signaling. For example, the WTRU 102 may be configured with a signal quality threshold (e.g., an RSRP threshold) and if the WTRU 102 does not detect a signal associated with an availability state (e.g., a presence signal or an SSB) with a signal strength above the threshold, the WTRU 102 may assume that this availability state is not active and may assume a different availability state. This criterion may be also coupled with a lack of detection of an identifying sequence of the presence signal (e.g., detection of the PSS sequence for example).

For example, a WTRU 102 may assume an availability state based on a time of day. The WTRU 102 may be configured to automatically assume a certain availability state (e.g., off, sleep, or dormant) for a configured subset of cells (e.g., capacity boosting cells) depending on the time of the day. For example, the WTRU 102 may determine that a capacity boosting cell has an availability state as "On" in certain hours of the day, "Deep sleep" in other configured hours, and "Off" in a third set of configured hours of the day or night.

For example, a WTRU 102 may assume an availability state based on an availability state of an associated cell (e.g., another carrier of the same MAC entity, another carrier in the same cell group, another carrier in the same gNB, another sector in the same gNB, and/or a configured associated cell, and/or capacity boosting cell).

For example, a WTRU 102 may assume an availability state based on detection of a PSS only signal or a simplified/stripped down SSB signal.

For example, a WTRU 102 may assume an availability state based on detection of an RS signal (e.g. CSI-RS, PRS, TRS) or the lack thereof.

For example, a WTRU 102 may assume an availability state based on the WTRU 102's RRC state (e.g., idle, inactive, or connected mode).

For example, a WTRU 102 may assume an availability state based on whether or not paging has been received, such as within a configured time window.

For example, a WTRU 102 may assume an availability state based on whether or not system information (e.g., periodic S1 or a subset of SIBs) have been received, such as within a configured time window.

For example, a WTRU 102 may assume an availability state based on measured channel condition(s) being below or above a threshold. The WTRU 102 may assume a change of NES state based on a change of measured channel conditions or making a channel measurement below or above a threshold. For example, the WTRU 102 may use a degradation in measurements of SSBs or CSI-RS, such as in combination with other signaling, to determine the NES state. For example, a configured window following a DCI reception can be used to measure SSBs and/or CSI-RS for degradation, and if a delta of a SSB-RSRP drop is measured the WTRU 102 may determine that the NES state has changed and assume associated actions for such NES state (e.g., trigger for CHO candidate selection or for group scheduling for a mobility command).

In certain representative embodiments, a WTRU 102 may be configured to monitor an indication that may characterize the level of network activity (e.g., an availability state). The network activity may be associated with a gNB and/or a cell. The WTRU 102 may assume the same availability state for all cells which are part of the same gNB (e.g. cells of the same MAC entity). The network activity indication (e.g., the presence indication) may include a channel (e.g., a PDCCH) and/or a signal (e.g., a sequence). The activity indication or the NES state change indication/command may indicate the level of activity the WTRU 102 may expect from the associated gNB and/or cell (e.g., reduced activity). The activity indication may contain activity information of other gNBs/cells. The activity indication may be a PDCCH containing group common signaling. For example, the NW may transmit a group common DCI to a group of WTRUs (e.g., WTRUs in a serving cell) indicating a change of an activity state or activity level in UL and/or DL. The CRC of the PDCCH may be scrambled with a dedicated "activity indication RNTI" or a "NES-RNTI". A WTRU 102 may be configured with at least one search space associated with the monitoring occasions of the activity indication PDCCH. The indication may consist of a go-to-sleep signal, such as a predefined sequence. When a WTRU 102 detects this sequence, the WTRU 102 may expect a reduced activity level over a specific time duration. The WTRU 102 may activate C-DRX for the period of time indicated. Alternatively, two sequences may be used to indicate regular activity and reduced activity.

For example, the signaling within the PDCCH or the activity indication may contain any (e.g., combination) of the following.

For example, the signaling within the PDCCH or the activity indication may include an expected activity level of the associated gNBs/cells over a specific time interval (e.g., an availability state). The activity levels may be predetermined and/or configured and may, for example, include regular and reduced activity. The signaling may indicate the activity level. For example, a bit "1" may indicate regular activity and a bit "0" may indicate reduced activity.

For example, the signaling within the PDCCH or the activity indication may include and/or be associated with, for each activity level (e.g. availability state), transmission and reception attributes. For example, during reduced activity, a WTRU 102 may not be expected to monitor certain PDCCH search spaces (e.g., including all SSs), and/or receive a certain type of PDSCH (e.g., including all PDSCH), and/or transmit PUCCH/PUSCH, and/or perform certain measurements. The WTRU 102 may start or stop monitoring PDCCH and/or TCI states associated with determined NES state, including PDCCH resources or TCI states associated with (de) activated TRPs or spatial elements.

For example, the signaling within the PDCCH or the activity indication may include a set of configurations that may be associated with an activity level and/or may be used/applied when that activity level is indicated (e.g., a NES parameter set). For example, SS configurations, CSI reporting configurations, indices of transmitted SSBs, etc. Each set of configurations may have an attribute associated with an activity level. For example, a tag that can be set to "reduced activity".

For example, the signaling within the PDCCH or the activity indication may include a time interval over which an activity level is assumed. The time interval may be indicated using a bitmap where each bit in the bitmap may be associated with a specific duration or transmission time interval (TTI) (e.g., a slot or a frame). For example, a bit "1" may indicate regular activity and a bit "0" may indicate reduced activity on an associated frame. The time interval may be indicated with a start time and length of interval. The start time may be defined. For example, it may be determined by adding a fixed offset to the time the indication is received. The length of the interval may be configured or signaled in the indication PDCCH.

For example, a time interval over which an activity level is assumed may be predetermined. The WTRU 102 may assume an interruption delay (or more generally a time until the NES state changes) after the NES state change command reception (e.g., after the last symbol or slot on which the command was received). The interruption time can be in absolute time, a number of symbols, or a number of slots, or other TTI.

In certain representative embodiments, a WTRU 102 may determine that an UL or DL resource and/or signal is available for transmission, reception, and/or measurement for the determined network availability state if it is applicable in the active availability state. The WTRU 102 may determine that a subset of measurement resources and/or signals (e.g., SSBs, CSI-RS, TRS, and/or PRS) are not applicable in certain availability states. The WTRU 102 may determine that a subset of UL and/or DL resources (e.g. PRACH, PUSCH, and/or PUCCH) are not applicable in certain availability states. The WTRU 102 may transmit some uplink signals only in a subset of NW availability states (e.g., SRS, SRSp, PRACH, and/or UCI).

The terms network NES state and cell NES state may used interchangeably herein. A WTRU 102 may know a cell NES state for one or more cells (e.g., through network configuration and indication). For example, a network NES state may refer to the NES states of one or more cells which could be serving cells, neighbor cells, etc. A NES state may imply an activation state only for a NES state, while another NES state may correspond to a deactivation state. The terms network availability state, cell turned off, SIB1-less operation, reduced SIB1/SSB periodicity state, (de)-active cell DTX mode/configuration, and/or NES state may be used interchangeably. The WTRU 102 may determine an SSB/SIB1 transmission state (whether they are transmitted and/or periodicity) implicitly from a determined active availability state, and vice-versa. Herein, a NES cell may refer to a cell that is applying at least one NES technique, is in a NES state (e.g. activated NES state), and/or is capable or configured to apply an NES technique at some point. Therefore, a non-NES cell may be used to refer to any cell that is not designated as a NES cell (e.g. not in a NES state or cannot/doesn't apply a NES technique). In some embodiments, the designation of which cell(s) can be a NES cell(s) may be configured (e.g. by broadcast or dedicated signaling).

For example, in one or more NES state(s), a WTRU 102 may transmit a wake up signal (e.g., PRACH, SR, PUCCH, UCI on PUCCH, a MAC CE or UE assistance information, SRS resource) to request a change in the NES state, additional UL or DL resources, reception of on-demand SSB, reception of on-demand SIB1/S1, and/or activation of a given cell (e.g., one that is in a NES state). Triggers for the WTRU 102 to transmit a wake-up signal and/or request reception of an on-demand SSB may include any of or be based on: detection of a reference signal, detection of a change of TCI state, making a channel measurement on the cell or an associated cell less than or greater than a threshold, arrival of new data (e.g., for a given LCH/LCG), amount of buffered data exceeding a threshold (e.g., for a given LCH/LCG), positioning being within a given range, triggering BSR/SR, based on triggering a L3 mobility event, the WTRU 102 or cell DTX/DRX status, expiry of a timer, and/or receiving a request from higher layers to transmit on-demand SSB request.

Beams

In certain representative embodiments, a WTRU 102 may transmit or receive a physical channel or reference signal according to at least one spatial domain filter. The term "beam" may be used to refer to a spatial domain filter. The WTRU 102 may transmit a physical channel and/or signal (e.g., PUCCH, PUSCH, SRS) using the same spatial domain filter as the spatial domain filter used for receiving an RS (e.g., CSI-RS) or a SS block. A WTRU 102 transmission may be referred to as a "target", and the received RS or SS block may be referred to as a "reference" or "source". For example, the WTRU 102 may be said to transmit the target physical channel or signal according to a spatial relation with a reference to such RS or SS block.

In certain representative embodiments, a WTRU 102 may transmit a first physical channel and/or signal according to the same spatial domain filter as the spatial domain filter used for transmitting a second physical channel and/or signal. The first and second transmissions may be referred to as "target" and "reference" (or "source"), respectively. In such case, the WTRU 102 may be said to transmit the first (e.g., target) physical channel or signal according to a spatial relation with a reference to the second (e.g., reference) physical channel or signal. A spatial relation may be implicit, configured by RRC, and/or signaled by MAC CE and/or DCI. For example, a WTRU 102 may implicitly transmit PUSCH and DM-RS of PUSCH according to the same spatial domain filter as an SRS indicated by an SRI indicated in DCI or configured by RRC. In another example, a spatial relation may be configured by RRC for an SRS resource indicator (SRI) or signaled by MAC CE for a PUCCH. Such a spatial relation may also be referred to as a "beam indication".

In certain representative embodiments, a WTRU 102 may receive a first (e.g., target) downlink channel and/or signal according to the same spatial domain filter or spatial reception parameter as a second (e.g., reference) downlink channel and/or signal. For example, such association may exist between a physical channel, such as PDCCH or PDSCH, and its respective DM-RS. At least when the first and second signals are reference signals, such an association may exist when the WTRU 102 is configured with a quasi-colocation (QCL) assumption type D between corresponding antenna ports. Such an association may be configured as a transmission configuration indicator (TCI) state. A WTRU 102 may be indicated an association between a CSI-RS, or SS block, and a DM-RS by an index to a set of TCI states configured by RRC and/or signaled by MAC CE. Such an indication may also be referred to as a "beam indication".

As used herein, an SSB may refer to one or more SSB beams (e.g., spatial relations) within a collection of SSBs (e.g., an SSB burst). An SSB may refer to a beam, and vice-versa, and/or a CSI-RS resource related to the beam. For example, SSB, SSBs, and/or SSB burst may refer to one or more beams transmitted from a TRP or a NW node. In certain representative embodiments, the terms 'RS', 'RS beams', 'SSB' and 'SSB beams' may be used interchangeably. In certain representative embodiments, the terms 'RS configuration', 'RS beam configuration' and 'set of RS beams' may be used interchangeably, such as when referring to a set of RS beams that may be grouped and/or share common properties/characteristics.

Configuration Information Associated with References Signals for NES

In certain representative embodiments, a WTRU 102 may receive configuration information, and/or sub-configurations (e.g., a subset of parameters associated with a configuration, such as an update to one or more configurations) associated with RSs. RSs may be applicable (e.g., used) in DL and/or UL, and may include any (e.g., combination) of the following.

For example, the RSs may include one or more SSBs, such as legacy NR SSBs (e.g., including cell defining SSBs (CD-SSB) or non-cell defining SSBs (NCD-SSBs)) and/or SSBs that are on a synchronization raster or off a synchronization raster.

For example, the RSs may include one or more enhanced RSs, such as new RSs and/or SSBs that may include an additional or lower set of resources and/or parameters than those in legacy SSBs (e.g., a combination of PSS/SSS, MIB, PBCH, pre-SIB1, SIB1, RACH config, UL WUS configuration, PUCCH resource configuration, SDT resources, SRS resources, etc.).

For example, the RSs may include one or more measurement RSs, such as CSI-RS, TRS, and/or PTRS.

For example, the RSs may include one or more NES-RSs, such as on-demand SSBs (OD-SSBs) that may be available in a certain duration (e.g., window) with certain periodicity and/or inter-burst gap from a start time onwards, and UE- and group-specific RSs (e.g., a set of RS beams that may be triggered and/or transmitted for a WTRU 102 or WTRU group).

For example, the RSs may include one or more light-RSs, such as RSs that contain a combination of one or more sync signals, PSS, SSS, discovery reference signal (DRS), PBCH only, or SIB1 only.

In certain representative embodiments, an RS configuration may be applicable for supporting one or more NES adaptations in any of (e.g., different) time, frequency, spatial and/or power domains. Such configuration information (e.g., parameters) may be applicable for any of the solutions described herein.

In certain representative embodiments, a configuration or sub-configuration associated with RSs, at least in part, may be received in a broadcast transmission (e.g., MIB, SIBx) and/or in dedicated RRC signaling (e.g., in a RRCReconfiguration message) during CONNECTED mode or in INACTIVE/IDLE mode (e.g., an RRCRelease message, when transitioning from CONNECTED mode to INACTIVE mode).

In certain representative embodiments, a configuration or sub-configuration associated with RSs may be received by a WTRU 102, at least in part, in one or more dynamic signaling indications (e.g., in MAC CE or DCI), and/or in NES and/or cell activity indications, for example. Such NES and/or cell activity indications may be received in RRC signaling, MAC CE, DCI (e.g., UE-specific or group common DCI) or PDSCH, for example. In an example, a WTRU 102 may receive a first subset of parameters associated one or more RS configurations in RRC signaling, and a second subset of parameters (or an update to the parameters in the first subset) may be received in dynamic signaling (e.g., MAC CE, DCI).

In certain representative embodiments, a WTRU 102 may receive, in configuration information, one or more (e.g., combination) of the following parameters associated with a RS configuration or a RS sub-configuration.

For example, the parameters associated with a RS configuration or a RS sub-configuration may include indexes and/or IDs of one or more RS configurations, RS resource sets, and/or resources.

For example, the parameters associated with a RS configuration or a RS sub-configuration may include RS resources. As an example, time domain resources may be characterized by a number of symbols per slot (e.g., 1, 2, 4 symbols per slot), a start offset symbol, a repetition factor, a burst periodicity, a duration or window of RS transmission, a time gap between beams, RSs, and/or bursts, and/or a comb and/or interleaving pattern. As an example, frequency domain resources may be characterized by a number of PRBs, a start offset PRB, a repetition factor, and/or a comb pattern. As an example, spatial domain resources may be characterized by a number of RSs and/or beams in a burst, a position of RSs in a burst (e.g., bitmap), a beamwidth of RS beams (e.g., wide-beams, narrow beams). A (e.g., each) RS configuration or sub-configuration may include resources which may or may not overlap with the resources in other RS configurations or sub-configurations, for example. As an example, the resources allocated for one or more RS configurations or sub-configurations may correspond to a RS resource pool.

For example, the parameters associated with a RS configuration or a RS sub-configuration may include RS ports, such as a number and/or set of Tx and/or Rx ports.

For example, the parameters associated with a RS configuration or a RS sub-configuration may include a resource type, such as corresponding to the time-domain behavior of a RS resource configuration which may be periodic, semi-persistent, or aperiodic.

For example, the parameters associated with a RS configuration or a RS sub-configuration may include a usage type, such as an association with any of beam management, RLM, NES, codebook/non-codebook, and/or antenna switching for using such RSs.

For example, the parameters associated with a RS configuration or a RS sub-configuration may include a slot level periodicity and/or a slot level offset (e.g., for periodic or semi-persistent RS).

For example, the parameters associated with a RS configuration or a RS sub-configuration may include a RS resource and/or beam bandwidth.

For example, the parameters associated with a RS configuration or a RS sub-configuration may include frequency hopping information. For example, a WTRU 102 may be configured with one or more hopping patterns that may be applied over a set of RS resources in any of the time, frequency, and/or spatial domains. In a hopping pattern, a partial set of RS resources in the frequency domain (e.g., PRBs) may be used in each time domain resource (e.g., symbol) for transmitting or receiving an RS using different spatial relations. Such a hopping pattern may correspond to one or more NES adaptations and/or states, for example.

For example, the parameters associated with a RS configuration or a RS sub-configuration may include a guard period, such as number of symbols, slots, or milliseconds. A WTRU 102 may apply the guard period when switching between different RS configurations or sub-configurations, or when switching between different Rx ports for RS reception.

For example, the parameters associated with a RS configuration or a RS sub-configuration may include RS comb pattern information. A parameter may include a transmission comb value, which may be associated with a gap in terms of the number of PRBs or number of symbols/slots between two RS resources in the frequency and/or time domains. For example, a (e.g., each) RS configuration may include one or more RS comb patterns, where each pattern may be associated a different set of parameters (e.g., offset value, cyclic shift) and/or RS resources in any of time, frequency, and/or spatial domains. For example, a comb pattern may include RS resources in different symbols (e.g., within one slot or across multiple slots) or slots, such as where the RS in different symbols or slots may be received with different spatial relations or filters. As an example, when a RS is configured with periodic or semi-persistent RS resources, an RS comb pattern (e.g., using resources in time, frequency, and/or spatial domains) may be repeated in each period. As an example, when a RS is configured with aperiodic RS resources, the RS burst may include RS resources in time, frequency, and/or spatial domains.

For example, the parameters associated with a RS configuration or a RS sub-configuration may include a comb offset hopping pattern (e.g., with repetition).

For example, the parameters associated with a RS configuration or a RS sub-configuration may include a RS sequence type or ID (e.g., m-sequence, Zadoff-Chu sequence).

For example, the parameters associated with a RS configuration or a RS sub-configuration may include one or more power control (PC) parameters. PC parameters may include alpha, p0, power per RS block, pathloss reference RS, and/or RS power control adjustment states (e.g., closed loop factor).

In certain representative embodiments, a WTRU 102 may be configured with any (e.g., combination) of the following properties and/or parameters for TCI states associated with RSs.

For example, the properties and/or parameters associated with TCI states may include a property associated with a quantity. As an example, one or more TCI states (e.g., indicated by index/ID) may be associated with a set or pool (e.g., indicated by a pool ID). As an example, a (e.g., each) TCI state may be associated with one or more RSs (e.g., SSB, NES-RS, CSI-RS, TRS, SRS) as a QCL source.

For example, the properties and/or parameters associated with TCI states may include a property associated with a RS configuration or sub-configuration. A (e.g., each) RS configuration or sub-configuration may be associated with one or more TCI states. As an example, one or more RS configurations or sub-configurations may be associated with a common pool of TCI states. TCI states in different RS configurations or sub-configurations may be non-overlapping (e.g., a first RS configuration 'config1' may be associated with TCI states {TCI1, TCI2} and a second RS configuration 'config2' may be associated with TCI states {TCI3, TCI4}).

For example, the properties and/or parameters associated with TCI states may include a property associated with triggering. One or more TCI states may be activated/deactivated upon configuration (e.g., via RRC signaling) or with dynamic signaling (e.g., MAC CE and/or DCI). As an example, a granularity of TCI state activation/deactivation may be done on the basis of: per TCI state, per-TCI state pool, per RS-configuration, and/or per RS-sub-configuration.

For example, the properties and/or parameters associated with TCI states may include QCL sources, such as IDs/indexes (e.g., RS ID/index, SSB index, NES-RS index, CSI-RS resource ID) and/or type of resource and/or signal (e.g., periodic, semi-persistent, aperiodic, on-demand, slim/lean). As an example, each TCI state may be associated with a RS resource/beam as a QCL source or reference signal/beam for determining a spatial relation.

For example, the properties and/or parameters associated with TCI states may include QCL types (e.g. Type A (doppler shift, doppler spread, average delay, delay spread), Type B (doppler shift, doppler spread), Type C (average delay, doppler shift), Type D (spatial Rx)).

For example, the properties and/or parameters associated with TCI states may include one or more validity conditions. The validity conditions associated with one or more TCI states may include time validity, location or spatial validity, or (de)activation signaling. As an example, a time validity may indicate the validity duration from the reception of the configuration or triggering indication (e.g., start of a timer) to the end of the duration (e.g., end of a timer) during which the WTRU 102 may assume the configured and/or indicated TCI state(s) are valid. As an example, a location/spatial validity may indicate the ID list of the cells/TRPs/NW nodes whose coverage in which the WTRU 102 may assume the configured/indicated TCI state(s) are valid. As an example, a WTRU 102 may assume a TCI state as valid when receiving signaling indicating TCI state activation, and as invalid when receiving signaling indicating TCI state deactivation. Any of the validity conditions above may be applicable for determining the validity of the RS configuration. As an example, when any of the validity conditions are not met, the WTRU 102 may release the TCI states and/or send a request or indication for new (e.g., updated) TCI states.

In certain representative embodiments, a WTRU 102 may receive (e.g., in configuration information), any (e.g., combination) of the following events, conditions and/or threshold values for selecting or using any of the RS configurations, sub-configurations, RS resources, and/or TCI states for RSs.

For example, the WTRU 102 may receive information indicating measurement threshold values. As examples, the measurement threshold values may be associated with any of energy per resource element (EPRE), reference signal received power (RSRP), reference signal received quality (RSRQ), signal to interference plus noise ratio (SINR), and/or channel quality indicator (CQI). For example, the WTRU 102 may select an RS (e.g., to replace another RS that may be switched off), when the measurements made on an associated and/or replacement RS and/or TCI state is higher or lower than a RSRP threshold.

For example, the WTRU 102 may receive information indicating timing information. For example, a start time threshold may be used, such as where an RS resource/beam may be received if it begins no later than a start time T1 symbols/slots/ms after the WTRU 102 receives an indication associated with activation of the RS configuration to which the RS resource belongs. For example, an end time threshold may be used, such as where an RS resource and/or beam may be received if it ends no earlier than an end time T2 symbols/slots/ms after the WTRU 102 receives an indication associated with activation of the RS configuration to which the RS resource belongs. For example, a time window (e.g., start offset time, length) may be used, such as where the WTRU 102 may use one or more RS configurations that may be accommodated within the time window for RS transmission.

For example, the WTRU 102 may receive information indicating a transmission and/or reception power. For example, a Tx power threshold may be used, such as where the WTRU 102 may use one or more RS resources (e.g., in time domain and/or frequency domain) if the transmit/receive power (e.g., total power in RS resources in a transmission instance or TTI) is less than a first power threshold value and/or greater than a second power threshold value. For example, a power spectral density (PSD) threshold may be used, such as where the WTRU 102 may use one or more RS resources (e.g., in the time and/or frequency domain) if the PSD over the RS resources is less than a first PSD threshold value and/or greater than a second PSD threshold value.

For example, the WTRU 102 may receive information indicating a priority. One or more priority values may be associated with any of the RS configurations, sub-configurations, RS resources, RS parameters, and/or TCI states. For example, the WTRU 102 may use an RS configuration, when the priority associated with the RS configuration is higher than a first priority threshold value and/or lower than a second priority threshold value.

For example, the WTRU 102 may receive information indicating one or more events, including a change of RSRP measurements of a RS (e.g., when NW does NES adaptation), an indication of TCI state(s) changes, and/or detection of RRM/BM/mobility events (e.g., HO, RLM, RLF events).

Determining Replacement RS Beams During Fast Beam Switching

In certain representative embodiments, during RS beam switching, a WTRU 102 may determine to update and/or change a set of one or more source and/or existing RS beams, such as may be configured and/or used as QCL sources for other signals and/or channels (e.g., DMRS of PDCCH, DMRS of PDSCH, SRS) and/or measurement objects (e.g., for L3, L2, L1 measurements), with a set of target and/or replacement RS beams. For example, existing RS beams may correspond to an active set of beams that may be in use (e.g., as QCL sources or measurement objects) and the replacement RS means may be a set of beams that may replace the existing set. For example, replacement RS beams may be associated with a set of existing RS beams based on similar QCL properties (e.g., similar antenna ports, elements, and/or panels used for transmission or similar channel properties) and/or configured from a similar pool of resources. The WTRU 102 may determine to change the RS beams with the replacement beams based on an indication received from network and reconfigured information on QCL relations (e.g., association between TCI states and corresponding DL-RSs). Any of the configurations, parameters, and embodiments described in this section are applicable in other sections of this disclosure.

In certain representative embodiments, a WTRU 102 may be configured with parameters for determining replacement RS beams.

In certain representative embodiments, a WTRU 102 may receive configuration information from the NW which may be associated with one or more existing and/or replacement RS beams. The configuration information may be received, entirely or in one or more parts, in any of L3/RRC signaling, L2/MAC signaling (e.g. MAC CE), and/or L1/PDCCH (e.g. DCI) indications. The configuration information may include any (e.g., combination) of the following.

For example, the configuration information may include information indicating a set of RS beams. A WTRU 102 may be configured with one or more RS beams that may be grouped into one or more sets of RS beams. The RS beams in a set may be associated with one or more common properties and/or characteristics. Common properties of the RS beams in a set may include any of: a QCL property, an association with a common QCL source (e.g., all RSs in the set share the same DL-RS as a QCL source), a general type (e.g., legacy SSB type, new SSB type), an RS type (e.g., SSB, CSI-RS), a resource type (e.g., periodic, semi-persistent, aperiodic, on-demand), a periodicity, a number of beams in a burst, a priority/importance of RS beams, a size of beamwidth, a frequency band, and/or a BWP. As an example, when any of a property and/or association for at least one of the RS beams in a set is changed or adapted, a similar change or adaptation may apply for one or more of the other RS beams in the set.

For example, the configuration information may include information indicating QCL relation information for one or more TCI states. A WTRU 102 may be configured with one or more TCI states, where each TCI state may include at least a source RS as a QCL source and QCL relation information. Such QCL relation information may include an association between a set of one or more source RS beams and a set of variable RS beams. In this case, a source RS beams may be any of SSB and CSI-RS beams, that may be configured as default or active QCL sources for one or more TCI states. Each of the source RS beams may be assigned with an ID or index value. The variable RS beams may be associated with one or more variable or virtual RS beams that may or may not be active (e.g., may or may not be transmitted by the base station, pending transmission). Each of the variable RS beams may be assigned with an ID or index value, which may be a wildcard value (e.g., a value that may be substituted for any of a defined subset of all possible values and/or indexes), and which may be different than those assigned to the source RS beams. In examples, the ID or index of a variable RS beam may be associated with an ID or index of an actual RS beam.

For example, a first TCI state with a first index 'TCI1' may be associated with a first source RS 'RS1' (e.g., as a QCL source) which may be associated with a set of variable RS beams with indexes {A, B, C, D}. A second TCI state with a second index 2 'TCI2' may be associated with a second source RS 'RS2' which may be associated with a set of variable RS beams with indexes {B, C}. A third TCI state with a third index 'TCI3' may be associated with a third source RS 'RS3' which may be associated with a set of variable RS beams with indexes {A, D}.

In the example above, for the first index 'TCI1', any of the variable RS beams in the set with indexes {A, B, C, D} may be associated with the source RS beam 'RS1'. For instance, a variable RS beam with the index 'A' may replace the source RS beam 'RS1' as the QCL source for the TCI state with index 'TCI1'.

In some representative embodiments, which may be related to spatial domain adaptation for NES, the source RS beams may be narrow beams and the variable RS beams may be narrow-beams.

In another example, one or more of the TCI states may include an RS beam that may correspond to any of the RS beams in an RS set, where at least one of the RS beam may be designated or indicated as a source RS. For example, a TCI state with a first index 1 'TCI1' may be associated with an RS 'RSx', which may be associated with an RS set consisting of RS beams with indexes {5, 6, 7}, where RS beam index '6' may be designated as the QCL source.

In another example, from among the configured TCI states, a subset of the TCI states may include one or more source RS beams. The WTRU 102 may infer the source RS beams for the other subset of TCI states (without such source RS) based on rules (e.g., common QCL relations and/or properties) or separate signaling that may indicate the QCL relation between the RSs of one set/subset and the RSs of another set/subset, for example.

For example, the configuration information may include information indicating hierarchical relation information. A WTRU 102 may be configured with relation and/or mapping information that may indicate the hierarchy or structure between one or more RS beams. Such relation and/or mapping information may be used for determining (e.g., deriving) the set of RS beams that may replace an existing set of RS beams with similar properties (e.g., QCL properties, channel or link conditions) when an existing set are dynamically switched off.

In some representative embodiments, such relation information may indicate the relation and/or mapping between a set of root TCI states and TCI sub-states. In this case, each of the root TCI states may be associated with an RS beam as a QCL source, which may correspond to a wide-beam (e.g., a beam with a wider beamwidth or wider coverage). Similarly, each of the TCI sub-states may be associated with an RS beam as a QCL source, which may correspond to a narrow-beam (e.g., a beam with a narrower beamwidth or narrower coverage). The TCI sub-states may be part of a common pool of TCI states (e.g., DL-only, UL-only, or Joint DL and UL) that may be associated with one or more sets of RS beams (e.g., as QCL sources). For example, the RS beams of the root TCI states and TCI sub-states may be associated with common QCL properties and/or one or more differential QCL properties. When an RS beam (e.g., a narrow-beam) associated with a TCI sub-state is deactivated, the RS beam may be replaced by another RS beam (e.g., a wide-beam that overlaps or covers the narrow beam) associated with a root TCI state.

For example, the mapping between root TCI states and TCI sub-states may be configured as a first root TCI state 'TCI1' that includes TCI sub-states {TCI1-1, TCI1-2, TCI1-3}, and a second root TCI state 'TCI2' that includes TCI sub-states {TCI2-1, TCI2-2}. In this case, the TCI state with index '1' is associated with the TCI sub-states with indexes 1-1, 1-2 and 1-3.

In another example, the hierarchical relation between the RS beams may be configured and/or derived based on extensions to the ID or index values associated with the beams. For example, the root/source/initial beams may be assigned with the index '1' and the alternative/variable/replacement beams may be assigned with indexes '1-1', '1-2', etc.

In another example, the hierarchical relation between the RS beams may be configured and/or derived based on extensions/coding applied to the physical cell or SSB ID (e.g., PCI) value that may be encoded in the resources associated with the RS. For example, the root/source/initial beams may be encoded with a PCI value of '1' and the alternative/variable/replacement beams may be encoded with a PCI value of '1-2'. Such encoding may be applied by adding or scrambling the extension value of '2' to the root PCI value of '1' (e.g., extended PCI=PCI value+extension value).

For example, the configuration information may include information indicating a measurement configuration. The WTRU 102 may be configured parameters associated with measurements (e.g., for L3, L2, and/or L1 measurements) including one or more measurement objects (MOs). MOs may include any of RS, SSBs, and/or CSI-RS listed herein. A measurement configuration may include an association between a source MO (e.g., source RS beam) and a set of variable MOs (e.g., variable RS beams). For example, the WTRU 102 may be configured with associations where a first MO 'MO1' is associated with the set of variable MOs {A, B, C, D}, a second MO 'MO2' is associated with the set of variable MOs {B, C}, and a third MO 'MO3' is associated with a set of variable MOs {A, D}. In this case, for example, any of the variable MOs in the set with indexes {A, B, C, D} may correspond to the source MO1.

For example, the configuration information may include information indicating an application time and/or delay. The WTRU 102 may be configured with one or more application time and/or delay values, which may indicate a time duration starting with the time instance (e.g., symbol or slot) from the reception of an indication indicating to change the existing RS beams to the time instance when the existing RS beams are no longer available and/or when the replacement RS beams may be available. As another example, the application time and/or delay may indicate a time duration starting with a time instance from the reception of an indication indicating the availability of replacement RS beams for existing RS beams to the time instance when the replacement RS beams are (e.g., actually) available.

For example, the configuration information may include information indicating frequency band and/or control resources associated with existing and/or replacement RS beams. The WTRU 102 may be configured with any of frequency band and/or BWP information where the existing or replacement RS beams may be received, synchronization raster information (e.g., ID/index of the synchronization raster where the RS beams may be located), control resource set (CORESET) and/or PDCCH monitoring configuration where the control indications associated with the existing ad/or replacement RS beams may be received. For example, when the frequency resources for the existing RS beams and replacement RS beams may be located in different bands (or BWPs), the WTRU 102 may switch to a corresponding band for receiving the replacement RS when the existing RS is switched off. The WTRU 102 may also switch from a first PDCCH monitoring configuration associated with existing RS beams to a second PDCCH monitoring configuration associated with a replacement beam, when the RS beams are switched on or off, for example.

For example, the configuration information may include information indicating validity information associated with existing and/or replacement RS beams. The WTRU 102 may be configured validity information associated with the existing and/or replacement RS beams. The validity information may be associated with any of time and/or location attributes. For example, a time validity may indicate the time duration (e.g., in terms of symbols, slots) during which any of the existing and/or replacement RS beams may be assumed to be valid. After the end or expiry of the time duration, the WTRU 102 may assume the RS beams are no longer available or valid. In an example, any of the RS beam switching may be associated with certain NES state(s) or mode(s). In another example, a location validity may indicate the coverage area or location, such as may be associated with a WTRU 102 location and/or cell ID, in which any of the existing and/or replacement RS beams may be assumed to be valid. Outside of the location validity, the WTRU 102 may assume the RS beams are no longer available or valid, for example.

For example, the configuration information may include information indicating NES states and/or modes. The WTRU 102 may be configured with information indicating an association between NES states and/or modes and the corresponding RS beams that may be switched on and/or off. For example, when configured with a cell DTX configuration (e.g., including certain periodically occurring active and non-active periods), a first set of RS beams (e.g., a source set) may be available during the cell DTX active periods and a second set of RS beams (e.g., a replacement set) may be available during the cell DTX non-active periods or when cell DTX mode is deactivated. As another example, the first set of RS beams may be available in a group of symbols, slots, and/or periods and the second set of RS beams may be available in another group of symbols, slots, and/or periods.

In certain representative embodiments, a WTRU 102 may receive an indication associated with RS beam switching. For example, a WTRU 102 may receive one or more indications from the NW associated with the switching of RS beams from a set of source or existing RS beams to a set of replacement RS beams. The indication may be received in any (e.g., combination) of the following.

For example, the indication may be received in L3 (e.g., RRC) signaling. As examples, the indication may be received in any (e.g., dedicated) RRC messages for a WTRU 102 in connected and/or inactive mode, and/or in broadcast messages (e.g., MIB, SIBx) for a WTRU 102 in idle and/or inactive mode.

For example, the indication may be received in L2 signaling. As examples, the indication may be received in a MAC CE and/or any access stratum (AS) layer signaling, such as PDCP or RLC control PDU.

For example, the indication may be received in L1 signaling. As examples, the indication may be received in a DCI, including in any of scheduling/non-scheduling DCI formats, a TCI state indication (e.g., activation/deactivation of TCI states), a measurement related DCI (e.g., aperiodic CSI), paging DCI, and/or wake-up signaling.

In certain representative embodiments, the indication received by the WTRU 102 associated RS beam switching may indicate and/or contain any (e.g., combination) of the following.

For example, the indication may indicate and/or contain information indicating RS beams that are switched on and/or off. For example, the indication may indicate the IDs or indexes of beams that are switching on and/or off, such as the source RS beams that may be switched off and the replacement RS beams that may be switched on. The indication may be received in a bitmap format, where a bit '1' may indicate 'switching on' of an RS beam and a bit '0' may indicate 'switching off' of an RS beam.

For example, the indication may indicate and/or contain information enabling and/or disabling or activating and/or deactivating of one or more RS beam configurations. An indication for RS configurations may be associated with any of set of source (e.g., existing) RS beams and set of target (e.g., replacement) RS beams. An indication for RS configurations may be associated with any of periodic, semi-persistent, aperiodic and/or on-demand RSs. For example, periodic RS configurations may be triggered with RRC signalling. A subset of parameters (e.g., comb pattern, TCI states) associated with the RS configurations may be indicated or updated with dynamic signalling (e.g., MAC CE and/or DCI). An indication on (de)activation of RS configurations may be received in a bitmap format, such as having a certain configured length corresponding to the number of configured RS configurations, where the bit '1' in the bitmap may indicate the activation of an RS configuration and a bit '0' may indicate deactivation of an RS configuration.

In some representative embodiments, upon receiving an activation indication, a WTRU 102 may assume the resources associated with the activated RS configurations are usable (e.g., for measurements). As examples, the WTRU 102 may assume the resources in the activated RS configurations may be used for measurements immediately, after a certain application time (e.g., configured/indicated), or after receiving another triggering indication.

In some representative embodiments, upon receiving a deactivation indication, the WTRU 102 may assume the resources associated with the deactivated RS configurations are not usable for measurements. As examples, the WTRU 102 may assume the resources in the deactivated RS configurations may be unused for measurements immediately, or after certain application time (e.g., configured/indicated).

For example, the WTRU 102 may switch from a first set of one or more RS configurations to a second set of RS configurations when receiving a switching indication (e.g., indicating to switch to another set, via ID, of RS configurations) or a deactivation indication.

In some representative embodiments, the indication on RS configurations may include information on new and/or updated parameters associated with the configurations. For example, the indication may indicate a set of new resources and/or beams (e.g., in time, frequency, spatial domain) for one or more RS configurations.

In some representative embodiments, the indication may indicate a new resource and/or TCI pool from which the WTRU 102 may select the resources for one or more RS configurations. When receiving new and/or updated parameters, the indication may include the IDs or indexes of the RS configurations for which the new and/or updated parameters may be applicable or not applicable, for example.

For example, the indication may indicate and/or contain information of a variable RS beam (e.g., with index 'A') is replaced by another RS beam (e.g., with index 'y'). As an example, the WTRU 102 may be configured with a first TCI state '1' with a source RS beam 'RS1' which may be associated with a set of variable RS beams {A, B, C, D} and a second TCI state '2' with a source RS beam 'RS2' which may be associated with a set of variable RS beams {A, C}. The WTRU 102 may receive an indication indicating to replace the variable RS beam with index 'A' by an RS beam with index 'y'. In this case, the WTRU 102 may update all TCI states with a source RS beam that are associated with a set of variable RS beams with indexes 'A' with an RS beam with index 'y'.

For example, the indication may indicate and/or contain information for a change in property of the set of RS beams. As an example, the indication may indicate a source RS set (e.g., source RS beams or SSB type "legacy") is replaced by a replacement RS set (e.g., replacement or different RS beams or SSB type "new" or "6G").

For example, the indication may indicate and/or contain information for measurement objects. As an example, the indication may indicate a set of one or more variable MOs (e.g., with indexes 'A' and/or 'B') are replaced by another set of MOs (e.g., with indexes 'x' and/or 'y').

For example, the indication may indicate and/or contain information on one or more parameters associated with set of RS beams. As an example, the indication may indicate any of a start offset of the first replacement RS beam in a burst, a RS beam burst duration, a position of RS beams in a burst (e.g., a bitmap indicating the RS beams that are activate/inactive in burst), and/or periodicity.

For example, the indication may indicate and/or contain information Indication on a start and/or end of a transmission of RS beams. As an example, the indication may include the timing information (e.g., in terms of absolute time as symbols, slots, or milliseconds, or relative time with respect to a reference symbol, slot, or milliseconds) for the transmission of RS beams (e.g., the expected timing for WTRU 102 for the reception of RS beams). For example, the timing information may be indicated per RS beam set and/or configuration (e.g., a transmission time for each RS may be different with a different offset value). As another example, the indication may include the timing information for ending or stopping RS beam transmission. The indication may provide the length or duration of time (e.g., a max number of symbols, slots, milliseconds) for completing RS beam transmission that may be no later than a time window. The indication on RS beam transmission may be received in a separate indication or in the same indication as that of the activation and/or deactivation of one or more RS configurations.

For example, the indication may indicate and/or contain signalling on enabling and/or disabling and/or activation and/or deactivation of TCI states. The indication may correspond to a set, pool, and/or candidates of TCI states, which may be preconfigured in the WTRU 102. A set and/or pool of TCI states may be those associated with the UL TCI states (e.g., configured with UL-TCI-StateList), DL TCI states or joint TCI states (e.g., configured with dl-ORJointTCI-State-List). The indication may or may not be associated with the TCI states associated with the RS beam sets and/or configurations. For example, the indication may indicate the activation and/or deactivation status of a pool and/or list of TCI states, such as where a subset of which may be associated with one or more RS beam configurations and another subset of which may not be associated with the RS beam configurations. The indication may be received in a bitmap format, such as with a certain configured length corresponding to the number of configured TCI states, where a bit '1' in the bitmap may indicate the activation of a TCI state and a bit '0' may indicate deactivation of a TCI state.

In some representative embodiments, when a TCI state is activated, the WTRU 102 may assume one or more of the parameters associated with the TCI state (e.g., QCL source, QCL type, RS beam) are valid until the conditions invalidating the TCI state are met (e.g., expiry of the validity timer, reception of a deactivation indication).

In some representative embodiments, when configured with any parameters associated with a 'follow unified TCI state' type or indication, the WTRU 102 may determine the TCI state status (e.g., whether the TCI states are activated and/or deactivated) based on the received indication on the TCI states, such as where the TCI state statuses are configured separately (e.g., in RS configurations). The parameters associated with 'follow unified TCI state' may include those associated with the UL TCI states or joint TCI states. For example, the WTRU 102 may determine TCI state statuses and the spatial relation for RS beams based on the received indication on TCI states and the RS beam associated with the indicated TCI state.

For example, the signalling of an indication for TCI states may be received at a granularity of per TCI state, per cell, per carrier, per RS set, per RS configuration, and/or per RS sub-configuration. In an example, the indication on TCI states may be received as part (e.g., in a bit-field) of another indication associated with any activation and/or deactivation of RS configurations, NES adaptations, NES states and/or cell activity.

In some representative embodiments, when receiving an activation indication, the WTRU 102 may assume the parameters and/or signals associated with the activated TCI states (e.g., QCL sources, RS beams, QCL types) are valid and usable (e.g., for measurements). The WTRU 102 may assume the validity and/or usability of the activated TCI states immediately, or after a certain application time (e.g., configured/indicated), for example.

In some representative embodiments, when receiving a deactivation indication, the WTRU 102 may assume the parameters and/or signals associated with the deactivated TCI states (e.g., QCL sources, RS beams, QCL types) are invalid and/or not usable (e.g., for measurements). The WTRU 102 may assume the invalidity of the deactivated TCI states immediately or after a certain application time (e.g., configured/indicated), for example.

As an example, the WTRU 102 may switch from a first set of one or more TCI states to a second set of TCI states when receiving a switching indication (e.g., indicating to switch to another set, via ID, of TCI states) or a deactivation indication.

For example, the indication may indicate and/or contain signalling indicating the enabling and/or disabling and/or activation and/or deactivation of NES adaptations and/or NES states. The indication may indicate the NES adaptation schemes (e.g., IDs or indexes), such as SD/PD adaptations and cell DTX/DRX, based on which the WTRU 102 may determine or identify the associated TCI states and/or RS configurations (e.g., set of source RS beams, set of replacement RS beams), for example. As an example, the indication may include timing information (e.g., in terms of absolute time as symbols, slots, or milliseconds, or relative time with respect to a reference symbol, slot, or milliseconds) indicating when the NES adaptation is expected to start or end.

In certain representative embodiments, one or more of the indications on RS beam sets and/or configurations, and/or RS beam switching may be received in separate indications, such as via a combination of separate MAC CEs and/or DCIs (e.g., in a CORESET with UE-specific or group-common search spaces and/or RNTIs). For example, an indication on (de)activation of TCI states may be received in a first indication and an indication on the (de)activation of RS beam configurations may be received in a second indication. As another example, an indication associated with TCI states and RS beam configurations may be received in one indication. For example, the indication may be received in a single MAC CE or DCI, which may include multiple octets or codepoints associated with different TCI states and/or RS configurations, where each bit or codepoint may be linked to a TCI state and/or RS beam configuration.

In certain representative embodiments for each of the one or more indications, the WTRU 102 may be configured or indicated (e.g., in dynamic signalling) with an application time corresponding to the time instance from when the RS beam configuration and/or TCI states may be assumed to be activated and/or deactivated. The application time may be configured or indicated in time units of symbols, slots or milliseconds, such as in absolute time units (e.g., time of day) or relative time units (e.g., with respect to a reference time, time at which the indication is received, offset time, SFN). The WTRU 102 may be configured or indicated with the same or different application time values per indication type (e.g., for RS configuration, TCI states), per RS beam configuration, per TCI state, and/or per set of TCI states. For example, when configured with an application time value 'T', the WTRU 102 may assume one or more RS configurations may be active 'T' symbols or slots after receiving the indication indicating activation of the RS configurations.

In certain representative embodiments, a WTRU 102 may perform actions and/or behaviors based on receiving an indication associated with RS beam switching.

In certain representative embodiments, the WTRU 102 may perform one or more actions upon configuration and/or reception of indications from the NW on RS beam switching, such as from a set of source (e.g., existing) RS beams to a set of target (e.g., replacement) RS beams.

For example, the WTRU 102 may determine to update the TCI states (e.g., active states) and the RS beams associated with the TCI states based on the reception of an indication on replacement RS beams (e.g., IDs or indexes of replacement RS beams) and the configured QCL relation information (e.g. association between source RS beams and variable RS beams). For example, when configured with a first TCI state 'TCI1' with a source RS 'RS1' associated with variable RS beams {A, B, C, D} and a second TCI state 'TCI2' with a source RS 'RS2' associated with variable RS beams {A, C}, and upon reception of an indication indicating a variable RS beam with index 'A' is replaced by an RS beam with index 'y', the WTRU 102 may update the source RSs 'RS1' and 'RS2' (e.g., associated with 'TCI1' and 'TC2') with a target RS 'RSy' (e.g., as the replacement QCL source). A benefit of the indication, which may be received dynamically, is the QCL sources associated with one or more TCI states may be dynamically updated without having to reconfigure (e.g., all) applicable TCI states and the corresponding associations with RS beams.

For example, the indication received from the NW may also indicate a time duration (e.g., start and/or end time) during which a replacement RS beam may be available and/or received by the WTRU 102. During the time duration, the WTRU 102 may perform measurements on the replacement RS beam (e.g. 'RSy'), such as to determine whether the replacement RS beam may be suitable to replace the existing RS beam. The WTRU 102 may send a confirmation indication to the NW and/or measurement information, such as where certain measurement criteria associated with the replacement RS beam is met. For example, the criteria may include the RSRP of the replacement RS beam being above (or below) a threshold value and a RSRP change (or difference) between the existing RS beam and the replacement RS beam is above (or below) a threshold value. As an example, when the measurement criteria is not met (e.g., the RSRP change is above a threshold), the WTRU 102 may send a failure indication and/or measurement information. The WTRU 102 may (e.g., also) send a request to fallback to the existing RS beam or another alternative RS beam, such as when the measurement criteria is not met, for example.

As another example, associated with updating MOs, the WTRU 102 may determine to update the source MOs based on the configured QCL relation information and the indication on replacement MOs. For example, when configured with QCL relations for a first MO 'MO1' associated with a set of variable MOs {A, B, C,D}, a second MO 'MO2' associated with a set of variable MOs {B,C} and a third 'MO3' associated with a set of variable MOs {A,D}, and upon receiving an indication indicating that a MO with an index 'y' replaces the MO with index 'A', the WTRU 102 may determine to update the first MO1 and the third MO3 with the MO 'y'. The WTRU 102 may perform measurement on the replacement MO (e.g., MO 'y'), which may be temporarily available for measurements. The WTRU 102 may send a confirmation indication and/or measurements based on the measurement criteria associated with the replacement MO being met (e.g., the RSRP is above a threshold value). Otherwise, the WTRU 102 may send a failure indication and/or measurements information, if the criteria is not met, for example. The WTRU 102 may request a new replacement MO or fallback to the existing MO when the measurement criteria is not met.

As another example, the WTRU 102 may be configured with the following associations between a set of root TCI states and TCI sub-states, such as a first root TCI state 'TCI1' that includes TCI sub-states {TCI1-1, TCI1-2, TCI1-3} and a second root TCI state 'TCI2' that includes TCI sub-states {TCI2-1, TCI2-2}. The WTRU 102 may receive a first indication on the (de)activation of TCI sub-states. For example, the indication may indicate {TCI1-1=active, TCI1-2=active, TCI1-3=active, TCI2-1=active, TCI2-2=active}. The WTRU 102 may perform measurements on the RS beams associated with the activated TCI sub-states. The WTRU 102 may receive a second indication on the (de) activation of TCI sub-states, where the second indication may correspond to a RS beam switching indication. For example, the second indication may indicate {TCI1-1=not active, TCI1-2=active, TCI1-3=not-active, TCI2-1=not-active, TCI2-2=not-active}. The WTRU 102 may select, for measurements, the RS beams associated with the root TCI states corresponding to the second indication. The WTRU 102 may assume a root TCI state is active (e.g., the RS beam associated with the root TCI state) if at least one of the TCI sub-states is active. For example, the WTRU 102 may select for measurements (e.g., any of) the RSs associated with the root TCI state 'TCI1' based on the second indication. Next, the WTRU 102 may determine a usable TCI state and its associated RS beam as the replacement QCL source based on measurements of the associated RS. For example, if measurement criteria are met when making measurements on the RS of the root TCI state (e.g., the RSRP of an RS beam of 'TCI1' is above a first threshold and the RSRP change between RSs of 'TCI1' and 'TCI1-1' is below a second threshold), the WTRU 102 may select the RS beam associated with the usable TCI state as the replacement QCL source (e.g., a DL-RS associated with 'TCI1' replaces a DL-RS associated with 'TCI1-1'). Upon successfully selecting a replacement QCL source, the WTRU 102 may transmit an indication to the NW, such as information indicating the ID and/or index of the determined usable TCI state and/or the ID and/or index of the associated RS beam. Otherwise, if the measurement criteria are not met, the WTRU 102 may transmit an indication indicating any of, for example, a failure to select a QCL source, measurements made on the associated RS, a request for new TCI sub-states, and/or a request to fallback to previous TCI sub-state.

Enabling RLM During Fast Beam Switching

In certain representative embodiments, during RS beam switching, a WTRU 102 may determine to update and/or change a (e.g., any) set of one or more source (e.g., initial or existing) RS beams, that may be configured as RLM-RSs for supporting radio link maintenance and/or monitoring (RLM), and/or radio link failure detection and/or recovery procedures, with a set of target (e.g., replacement) RS beams. The target RS beams may be associated with the set of source RS beams based on (e.g., similar) QCL properties (e.g., antenna ports, elements, and/or panels used for transmission, and/or similar channel properties) and/or configured from a (e.g., similar) pool of resources (e.g., associated with a common and/or similar TCI pool). The WTRU 102 may determine to change (e.g., any of) the source RS beams that are used as RLM-RSs with the target RS beams based on an indication received from the network and reconfigured information on QCL relations (e.g., association between TCI states and corresponding DL-RSs). Any of the configurations, parameters, and embodiments described in this section may be applicable in other sections of this disclosure.

In certain representative embodiments, a WTRU 102 may be configured with a set of RS beams and one or more parameters associated with RLM.

In certain representative embodiments, a WTRU 102 may receive configuration information from the NW which may be associated with one or more source and target RS beams, such as set(s) of beams configured for RLM/RLF. The configuration information may be received, entirely or in one or more parts, in any of L3/RRC signalling, L2/MAC signaling (e.g. MAC CE), and/or L1/PDCCH (e.g. DCI) indications. The configuration information may include any (e.g., combination) of the following.

For example, the configuration information may include information indicating a set of RS beams for RLM (e.g., RLM-RSs). The WTRU 102 may be configured with one or more RS beams that may be grouped into one or more sets of RS beams. The RS beams in a set may be associated with or by one or more common properties and/or characteristics, for example. For example, when any of the properties and/or associations for at least one of the RS beam in a set is changed (e.g., adapted), a similar change (e.g., adaptation) may apply for at least a subset of the other RS beams in the set. As an example, a set of one or more RS beams may be configured as RLM-RSs (e.g., as QCL source for RLM), a subset of which may be used as source RLM-RSs and another subset may be used as target RLM-RSs. In this case, during RS beam switching, one or more of the source RLM-RS may be replaced by one or more of the target RLM-RS beams. As an example, the set of RS beams in the target RLM-RS that may replace the RS beams in the source RLM-RS may be associated with a common TCI pool.

For example, the configuration information may include information indicating one or more parameters associated with RLM. The WTRU 102 may be configured with any of the following (e.g., sets) of parameters: (i) RLM-RS monitoring periodicity (e.g., a periodicity at which the WTRU 102 may perform measurements of RLM-RS), a maximum and/or minimum count associated with radio link failure (e.g., 'N1'), a maximum and/or minimum count associated with radio link recovery (e.g., 'N2'), a maximum and/or minimum time duration associated with RLM (e.g., 'T1'), a maximum and/or minimum time duration associated with radio link recovery (e.g., 'T2'). In some representative embodiments, 'N1' may be referred to as 'NQout' and 'N2' may be referred to as 'NQin'. The 'N1' and 'N2' values may be related to the maximum counts for meeting BLER targets for hypothetical reception of signals and/or channels from the NW (e.g., PDCCH) when using the RLM-RS as a QCL source. In some representative embodiments, the 'T2' value may be associated with (e.g., use of) a 'T310' timer, for example. The set of parameters for RLM may be associated with a set of RS beams (e.g., used as RLM-RSs). The set of RLM parameters may be the same or different for different sets of RS beams (e.g., used as source RLM-RSs and target RLM-RSs). For example, a source RLM-RS and a target RLM-RS may use different sets of values for any of {N1, N2, T1, T2}. As an example, when configured for beam failure monitoring and/or recovery, the WTRU 102 may be configured with a set of parameters including a maximum and/or minimum count associated with beam failure detection (e.g., 'M1'), a maximum and/or minimum count associated with beam failure recovery (e.g., 'M2'), and a maximum and/or minimum time duration associated with beam recovery (e.g., 'T3'). The parameters for beam failure may be the same or different than those used for RLM, for example.

For example, the configuration information may include information indicating an application time and/or delay. The WTRU 102 may be configured with one or more application time and/or delay values, which may indicate a time duration starting with a time instance (e.g., symbol and/or slot) from the reception of an indication indicating to change the source RS beams to a time instance when the source RS beams are no longer available and/or when the target RS beams may be available. As another example, the application time and/or delay may indicate a time duration starting with a time instance from the reception of an indication indicating the availability of target RS beams to a time instance when the target RS beams are actually available. The application time and/or delay values may be associated with the availability and/or unavailability of the source and/or target RS beams for RLM.

Upon configuring and/or receiving an indication of one or more RS beams as source RLM-RS(s), the WTRU 102 may perform monitoring of the RS beams according to the parameters associated with RLM.

In certain representative embodiments, a WTRU 102 may perform RLF detection during RS beam switching.

For example, a WTRU 102 may receive an indication from the NW associated with the switching of RS beams from a set of source RS beams to a set of target RS beams (e.g., for RLM). The indication may be received in any of L3/RRC signaling, L2/MAC signaling (e.g., MAC CE), and/or L1/PDCCH (e.g., DCI) indications, for example. The indication may indicate any of the signaling, information, and/or parameters described herein. For example, the indication may indicate (e.g., activate) the set of target RS beams that may replace the set of source RLM-RS beams as target RLM-RS beams.

For example, the WTRU 102 may determine a first set of one or more target RLM-RSs, such as from the set of target RS beams (e.g., activated) for replacing the set of source RLM-RS beams, based on the received RS beam switching indication and the configured set of parameters for RLM.

As an example, the WTRU 102 may determine a first set of target RLM-RS from the target RS beams that have a start time (e.g., a first symbol of a first target RS beam in a burst and/or window) that is no later than a threshold value and/or an end time (e.g., a last symbol of a last target RS beam in a burst and/or window) that is within the time duration associated with the 'T1' and/or 'N1' parameters.

The WTRU 102 may perform RLM measurements (e.g., any of L3, L2, L1 measurements), such as of any of EPRE, RSRP, reference signal strength indicator (RSSI), and/or RSRQ, on the one or more RS beams that are selected or determined as a first set of target RLM-RS. In the case when the existing source RLM-RS beams are still available when the WTRU 102 determines the first set of target RLM-RS beams, the WTRU 102 may perform any of the following. The WTRU 102 may continue performing measurements on the source RLM-RS beams, such as along with measurements of the first target RLM-RS beams (e.g., in the symbols, slots, and/or occasions when the RS beams are received). The WTRU 102 may stop (e.g., suspend) performing measurements on the source RLM-RS beams. The WTRU 102 may send an indication to the NW indicating any of the stopping of RLM measurements on the source RLM-RS, a report on the measurements made on the source RLM-RS (e.g., up to the stopping time instance), and/or a confirmation indication on switching to the target RLM-RS (e.g., IDs and/or indexes of target RLM-RS beams and/or ID and/or index of set of target RLM-RS).

For example, when any link failure conditions (e.g., RSRP is less than a threshold value) are detected during RLM measurements on the first target RLM-RS beams, the WTRU 102 may increment a link failure counter at each RLM measurement instance. When making RLM measurements on the source RLM-RS and when the link failure counter is incremented to a certain 'n1' value, the WTRU 102 may continue the count 'x' in the link failure counter when switching to the first target RLM-RS and making RLM measurements (e.g., counter='n1'+'x').

As an example, when switching to the first target RLM-RS, the WTRU 102 may reset the link failure counter (e.g., counter=0) and apply a new count value when making RLM measurements. For example, the resetting of the link failure counter during RS beam switching may be conditional on any of the following: (i) the QCL and/or TCI pool in which the source and target RLM-RSs belong to, (ii) a time duration for switching between source and target RLM-RS, (iii) mobility of the WTRU 102, and/or (vi) a value of 'n1' prior to RS switching. For example, when the source RLM-RS and the target RLM-RS belong to different TCI pools or have different QCL properties, the WTRU 102 may reset the link failure counter. Otherwise, if both source and target RLM-RSs have the same QCL properties, the WTRU 102 may continue the count value in the counter when switching.

As an example, when detecting a link failure event (e.g., a number of consecutive link failure counts are greater than or equal to 'N1'), the WTRU 102 may determine a second set of one or more target RLM-RS beams, such as from the set of target RS beams (e.g., activated) for replacing the set of first set of target RLM-RS beams. For example, the WTRU 102 may determine a second set of target RLM-RSs from the active target RS beams that have a start time (e.g., a first RS beam in a burst) that is no later than a threshold value and/or an end time (e.g., a last RS beam in a burst) that is within the time duration associated with the 'T2' and/or 'N2' parameters. The WTRU 102 may send an indication to the NW, such as indicating any of the detection of a link failure event (e.g., when using the first target RLM-RS), measurements made on the first target RLM-RS, and/or selection of the second target RLM-RS(s). As another example, if there are no active target RLM-RS(s) that meet the selection criteria associated with the RLM parameters (e.g., 'T2', 'N2'), the WTRU 102 may send an indication to request for a (e.g., new) set of RS beams that may be used as a (e.g., second) target RLM-RS(s).

In certain representative embodiments, a WTRU 102 may perform radio link recovery during RS beam switching.

For example, the selected (e.g., determined) second set of target RLM-RS beams may be used for a link failure recovery procedure. In this case, the WTRU 102 may perform measurements (e.g., any of L3, L2, L1 measurements) on the one or more RS beams determined as the second target RLM-RS(s). When any link recovery conditions (e.g., RSRP is greater than a threshold value) are detected during RLM measurements on the second target RLM-RS beams, the WTRU 102 may increment a link recovery counter at each RLM measurement instance. The WTRU 102 may start a timer associated with 'T2' when triggering the link recovery procedure (e.g., when detecting the first link recovery count or when switching to the second target RLM-RS). In another example, the WTRU 102 may have triggered a link recovery procedure (e.g., incrementing the link recovery counter to 'n2' and/or started the 'T2' timer) during measurements on the first target RLM-RS. In this case, when receiving an indication on RS beam switching, the WTRU 102 may determine the second target RS beams and may continue the count 'y' in the link recovery counter when making measurements on the second target RLM-RS (e.g., counter='n2'+'y'). As another example, when switching to the second target RLM-RS(s), the WTRU 102 may reset the link recovery counter (e.g., counter=0) and/or the 'T2' timer. In this case, the WTRU 102 may apply a new count value and/or restart the 'T2' timer when making RLM measurements for link recovery. Such resetting of the link recovery counter during RS beam switching may be conditional on any of the same and/or similar conditions associated with link failure as described herein.

For example, when detecting a link recovery event (e.g., a number of consecutive link recovery counts are greater than or equal to 'N2' and/or the 'T2' timer has not expired), the WTRU 102 may reset the 'T2' timer or 'N2' counter, and/or may send an RLM report to the network. For example, the RLM report may include information indicating any of the measurements, such as L3, L2, L1 (e.g., RSRP) measurements made on the first and/or second target RLM-RS, IDs or indexes of the target RS beams in the first and/or second set of target RLM-RS(s), and/or any count values for link failure and/or recovery. In cases where link recovery is not possible (e.g., the 'T2' timer expires and/or a number of consecutive link recovery counts is less than 'N2'), the WTRU 102 may send an indication to request for a (e.g., new) set of RS beams for RLM and/or send a PRACH preamble (e.g., using CBRA/CFRA PRACH resources for triggering RRC connection re-establishment). The examples described for link failure detection and link recovery using source and target RLM-RS beams may also be applied for beam failure detection and beam recovery procedures, such as using a set of configured parameters (e.g., 'M1', 'M2', 'T3') associated with beam management.

Example Solutions

FIG. 3 is a configuration diagram illustrating an example of updating TCI state(s), according to one or more embodiments of the present disclosure. A WTRU may receive configuration information (e.g., be configured with) QCL relationship information. As shown as an example in FIG. 3, the configuration information (e.g., the QCL relationship information) may include configurations for a set of TCI states including a first TCI state 'TCI #1' 300*a*, a second TCI state 'TCI #2' 300*b*, and a third TCI state 'TCI #3' 300*c*. The first TCI state 'TCI #1' 300*a* may indicate an association between a first source RS beam 'RS #1' 302*a* and a first set of variable RS beams {A, B, C, D} 304*a*. For example, the first set of variable RS beams {A, B, C, D} 304*a* may be assumed by the WTRU to use the first source RS beam 'RS #1' 302*a* as a QCL source. The second TCI state 'TCI #2' 300*b* may indicate an association between a second source RS beam 'RS #2' 302*b* and a second set of variable RS beams {B, C} 304*a*. The third TCI state 'TCI #3' 300*c* may indicate an association between a third source RS beam 'RS #3' 302*c* and a third set of variable RS beams {A, D} 304*c*.

In FIG. 3, the WTRU may receive a (e.g., dynamic) switch indication 306*a*. The switch indication may include information indicating that a (e.g., potential) replacement RS beam '#y' is associated with one of the variable RS beams '#A'. The WTRU may determine to update certain ones of the set of TCI states as described herein. For example, the WTRU may determine to update certain TCI states based on the configured QCL relationship information and the dynamic indication.

As shown in FIG. 3, the WTRU may update the first TCI state 'TCI #1' 300*a* such that the replacement RS beam '#y' is associated with the first set of variable RS beams {A, B, C, D} 304*a* as the first source RS beam 302*a* (e.g., replaces the source RS beam 'RS #1'). For example, the WTRU may compare measurements of the source RS beam 'RS #1' and measurements of the replacement RS beam '#y' to determine whether one or more criteria for updating the first TCI state 'TCI #1' 300*a* are satisfied. For example, the WTRU may determine that a RSRP value of the replacement RS beam '#y' is above a first threshold and determine that a RSRP value change (e.g., difference) between the replacement RS beam '#y' and the source RS beam 'RS #1' is below a second threshold. Based on the one or more criteria being satisfied, the WTRU may send (e.g., at 210) an indication of the updated first TCI state 'TCI #1' 300*a*.

As also shown in FIG. 3, the WTRU may update the third TCI state 'TCI #3' 300*c* such that the replacement RS beam '#y' is associated with the third set of variable RS beams {A, D} 304*c* as the third source RS beam 302*c* (e.g., replaces the source RS beam 'RS #3'). For example, the WTRU may compare measurements of the source RS beam 'RS #3' and measurements of the replacement RS beam '#y' to determine whether one or more criteria for updating the third TCI state 'TCI #3' 300*c* are satisfied. For example, the WTRU may determine that the RSRP value of the replacement RS beam '#y' is above the first threshold and determine that a RSRP value change (e.g., difference) between the replacement RS beam '#y' and the source RS beam 'RS #3' is below the second threshold. Based on the one or more criteria being satisfied, the WTRU may send (e.g., at 210) an indication of the updated third TCI state 'TCI #3' 300*c*.

In other representative embodiments, one or more other measurement quantities (e.g., EPRE, RSRQ, SINR, CQI, and so forth) may be used in place of or in combination with RSRP.

In certain representative embodiments, the sets of variable RS beams may include one or more RS beams which are the same in two or more of the sets of variable RS beams. For example, in FIG. 3, the variable RS beam #A is included in the first set of variable RS beams 304*a* and the third set of variable RS beams 304*c*.

In other representative embodiments, the sets of variable RS beams may include RS beams which are (e.g., completely) different in each of the sets of variable RS beams. For example, the first set of variable RS beams may be represented as {A, B, C, D} and another (e.g., second/third) set of variable RS beams may be represented as {E, F, G, H}.

Figure 4:
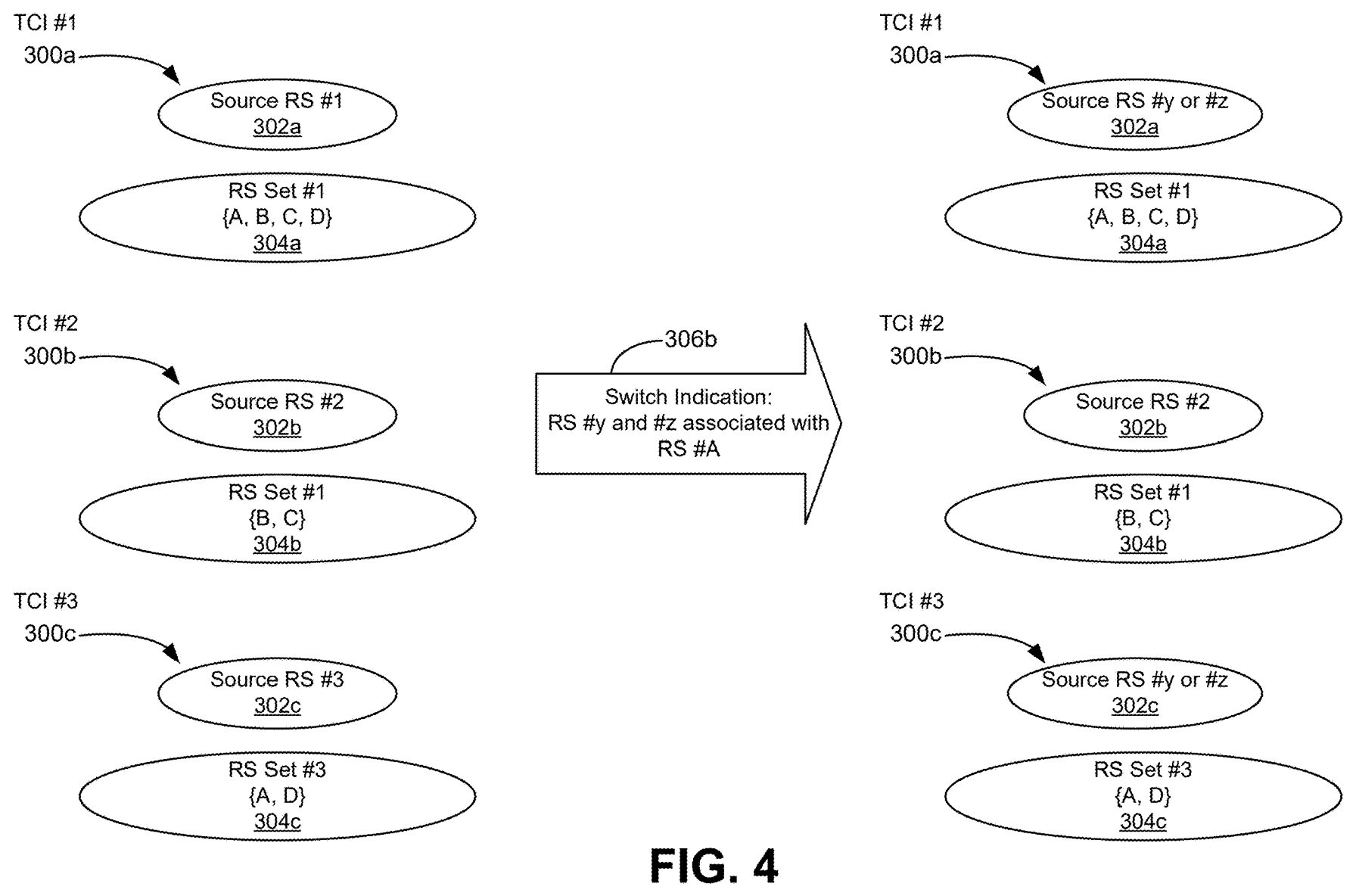

FIG. 4 is another configuration diagram illustrating an example of updating TCI state(s), according to one or more embodiments of the present disclosure. A WTRU may receive configuration information (e.g., be configured with) QCL relationship information. As shown as an example in FIG. 4, the configuration information (e.g., the QCL relationship information) may be similar to that in FIG. 3. For example, the configuration information may include configurations for a set of TCI states including the first TCI state 'TCI #1' 300*a*, the second TCI state 'TCI #2' 300*b*, and the third TCI state 'TCI #3' 300*c*.

In FIG. 4, the WTRU may receive a (e.g., dynamic) switch indication 306*b*. The switch indication may include information indicating that a set of (e.g., potential) replacement RS beams '#y' and #z are associated with one of the variable RS beams '#A'. The WTRU may determine to update certain ones of the set of TCI states as described herein. For example, the WTRU may determine to update certain TCI states based on the configured QCL relationship information and the dynamic indication.

As shown in FIG. 4, the WTRU may update the first TCI state 'TCI #1' 300*a* such that the replacement RS beam '#y' or #z is associated with the first set of variable RS beams {A, B, C, D} 304*a* as the first source RS beam 302*a* (e.g., replaces the source RS beam 'RS #1'). For example, the WTRU may compare measurements of the source RS beam 'RS #1' and measurements of the replacement RS beams '#y' and 'z' to determine whether one or more criteria for updating the first TCI state 'TCI #1' 300*a* are satisfied. For example, the WTRU may determine that a RSRP value of the replacement RS beam '#y' is above a first threshold and determine that a RSRP value change (e.g., difference) between the replacement RS beam '#y' and the source RS beam 'RS #1' is below a second threshold. The WTRU may determine that a RSRP value of the replacement RS beam '#z' is above the first threshold and determine that a RSRP value change (e.g., difference) between the replacement RS beam '#z' and the source RS beam 'RS #1' is below the second threshold.

In certain representative embodiments, the WTRU may choose to use either the replacement RS beam '#y' or #z as the first source RS beam 302*a* as the QCL source for the first set of variable RS beams {A, B, C, D} 304*a*. As an example, the WTRU may determine a RSRP of the replacement RS beam '#y' is greater than a RSRP of the replacement RS beam '#z' and select the replacement RS beam '#y' as the first source RS beam 302*a*, or vice versa.

In certain other representative embodiments, either the replacement RS beam '#y' or #z as the first source RS beam 302*a* may be selected by the WTRU as the QCL source for the first set of variable RS beams {A, B, C, D} 304*a* using one or more other conditions and/or criteria.

In certain other representative embodiments, the switch indication 306*b* may include information to be used, such as a mapping or preference, for selecting either the replacement RS beam '#y' or #z.

Similarly, the WTRU may update the third TCI state 'TCI #3' 300*c* such that the replacement RS beam '#y' or #z is associated with the third set of variable RS beams {A, D} 304*c* as the third source RS beam 302*c* (e.g., replaces the source RS beam 'RS #3').

Based on the one or more criteria being satisfied, the WTRU may send (e.g., at 210) an indication of the updated TCI state(s) (e.g., the first TCI state 'TCI #1' 300*a* and third TCI state 'TCI #3' 300*c*).

FIG. 5 is another configuration diagram illustrating an example of updating TCI state(s), according to one or more embodiments of the present disclosure. A WTRU may receive configuration information (e.g., be configured with) QCL relationship information. As shown as an example in FIG. 4, the configuration information (e.g., the QCL relationship information) may be similar to that in FIG. 3. For example, the configuration information may include configurations for a set of TCI states including the first TCI state 'TCI #1' 300*a*, the second TCI state 'TCI #2' 300*b*, and the third TCI state 'TCI #3' 300*c*.

In FIG. 5, the WTRU may receive a (e.g., dynamic) switch indication 306*c*. The switch indication may include information indicating that a set of (e.g., potential) replacement RS beams '#y' and #z are associated with a set of variable RS beams, namely the variable RS beams '#A' and '#B'. The WTRU may determine to update certain ones of the set of TCI states as described herein. For example, the WTRU may determine to update certain TCI states based on the configured QCL relationship information and the dynamic indication.

As shown in FIG. 5, the WTRU may update the first TCI state 'TCI #1' 300*a* such that the replacement RS beam '#y' or #z is associated with the first set of variable RS beams {A, B, C, D} 304*a* as the first source RS beam 302*a* (e.g., replaces the source RS beam 'RS #1').

In certain representative embodiments, the WTRU may use (e.g., a comparison of) measurements of the replacement RS beams and measurements of the replacement RS beams to determine whether to update a TCI state to reflect one of the replacement RS beams as a QCL source. For example, the WTRU may compare measurements of the source RS beam 'RS #1' and measurements of the replacement RS beams '#y' and 'z' to determine whether one or more criteria for updating the first TCI state 'TCI #1' 300*a* are satisfied. For example, the WTRU may determine that a RSRP value of the replacement RS beam '#y' is above a first threshold and determine that a RSRP value change (e.g., difference) between the replacement RS beam '#y' and the source RS beam 'RS #1' is below a second threshold. The WTRU may determine that a RSRP value of the replacement RS beam '#z' is above the first threshold and determine that a RSRP value change (e.g., difference) between the replacement RS beam '#z' and the source RS beam 'RS #1' is below the second threshold.

As shown in FIG. 5, the WTRU may update the second TCI state 'TCI #2' 300*b* such that the replacement RS beam '#y' or #z is associated with the second set of variable RS beams {B, C} 304*b* as the second source RS beam 302*b* (e.g., replaces the source RS beam 'RS #2'). For example, the WTRU may compare measurements of the source RS beam 'RS #2' and measurements of the replacement RS beams '#y' and 'z' to determine whether one or more criteria for updating the second TCI state 'TCI #2' 300*b* are satisfied. As an example, similar comparisons using threshold information, such as the first and second thresholds above may be used.

As shown in FIG. 5, the WTRU may update the third TCI state 'TCI #3' 300*c* such that the replacement RS beam '#y' or #z is associated with the third set of variable RS beams {A, D} 304*c* as the third source RS beam 302*c* (e.g., replaces the source RS beam 'RS #3'). For example, the WTRU may compare measurements of the source RS beam 'RS #3' and measurements of the replacement RS beams '#y' and 'z' to determine whether one or more criteria for updating the third TCI state 'TCI #3' 300*c* are satisfied. As an example, similar comparisons using threshold information, such as the first and second thresholds above may be used.

In certain representative embodiments, the one or more criteria used for updating the set of TCI states may be the same. In certain representative embodiments, the one or more criteria used for updating the set of TCI states may be (e.g., indicated to be) specific to certain ones of the TCI states.

In certain representative embodiments, the WTRU may use a predefined (e.g., configured) mapping to determine how to update a TCI state to reflect one of the replacement RS beams as a QCL source. For example, the mapping may indicate which (e.g., specific beam) of the set of replacement RS beams may be applicable to certain ones of the TCI states. In some embodiments, the switch indication (e.g., switch indication 306*c*) may include an index to (e.g., a part of) the mapping which may be used to determine how to update a TCI state to reflect one of the replacement RS beams as a QCL source.

In certain representative embodiments, the WTRU may use a dynamic (e.g., via MAC CE or DCI) mapping to determine how to update a TCI state to reflect one of the replacement RS beams as a QCL source. For example, the mapping may indicate which (e.g., specific beam) of the set of replacement RS beams may be applicable to certain ones of the TCI states. In some embodiments, the switch indication (e.g., switch indication 306*c*) may include an index to (e.g., a previously received) mapping which may be used to determine how to update a TCI state to reflect one of the replacement RS beams as a QCL source.

In certain other embodiments, the mapping and measurement based approaches may be combined. For example, a (e.g., indicated) mapping may be used to determine which (e.g., subset) of the set of replacement RS beams may be applicable to a certain one of the TCI states. Measurements made on the subset of the set of replacement RS beams may be used to select a particular beam to be used as the QCL source for the certain one of the TCI states.

FIG. 6 is a flow diagram illustrating an example procedure of updating TCI state(s), according to one or more embodiments of the present disclosure. In FIG. 6, a WTRU 102 may receive configuration information including QCL relation information for one or more (e.g., a set of) TCI states at 602. For example, the one or more TCI states may include a first TCI state associated with a first source RS beam as a QCL source for a first set of variable RS beams. At 604, the WTRU 102 may determine one or more measurements using the first source RS beam. At 606, the WTRU 102 may receive beam switching information that includes information indicating a first replacement RS beam is associated with a first variable RS beam. For example, the first variable RS beam may be included in (e.g., is one of) the first set of variable RS beams. At 608, the WTRU 102 may determine one or more measurements using the first replacement RS beam. At 610, the WTRU 102 may send, in response to the beam switching information, information indicating that the first TCI state is updated to be associated with the first replacement RS beam as the QCL source for the first set of variable RS beams. For example, the WTRU 102 may (e.g., determine to) update the first TCI state based on the one or more measurements using the first source RS beam, the one or more measurements using the first replacement RS beam, and threshold information (e.g., using thresholds as described herein).

For example, the information indicating beam switching is received via a MAC CE and/or DCI.

For example, the WTRU 102, after sending the information that the first TCI state is updated at 610, may receive one or more transmissions using (i) the first set of variable RS beams and (ii) the first replacement RS beam as the QCL source for the first set of variable RS beams.

For example, the one or more TCI states may include a second TCI state associated with a second source RS beam as a QCL source for a second set of variable RS beams. The first variable RS beam may be included in (e.g., is one of) the second set of variable RS beams. The WTRU 102 may determine one or more measurements using the second source RS beam. The WTRU 102 may send, in response to the beam switching information, information indicating that the second TCI state is updated to be associated with the first replacement RS beam as the QCL source for the second set of variable RS beams. For example, the WTRU 102 may (e.g., determine to) update the second TCI state based on the one or more measurements using the second source RS beam, the one or more measurements using the first replacement RS beam, and the threshold information.

For example, the beam switching information may include information indicating a second replacement RS beam is associated with the first variable RS beam. The first variable RS beam may be included in (e.g., is one of) the first set of variable RS beams. The WTRU 102 may determine one or more measurements using the second replacement RS beam. The WTRU 102 may send, in response to the beam switching information, the information indicating that the first TCI state is updated to be associated with the first replacement beam as the QCL source for the first set of variable RS beams. For example, the WTRU 102 may (e.g., determine to) update the first TCI state based on (i) a comparison of the one or more measurements using the first replacement RS beam with the one or more measurements using the second replacement RS beam, and (ii) a comparison of a difference, between the one or more measurements using the first source RS beam and the one or more measurements using the first replacement RS beam, with the threshold information.

For example, the one or more TCI states may include a second TCI state associated with a second source RS beam as a QCL source for a second set of variable RS beams. The beam switching information may include information indicating the first replacement RS beam and a second replacement RS beam are associated with the first variable RS beam and a second variable RS beam. The WTRU 102 may determine one or more measurements using the second source RS beam. The WTRU 102 may determine one or more measurements using the second replacement RS beam. The WTRU 102 may select the first replacement RS beam as the QCL source for the first set of variable RS beams and the second set of variable RS beams based on a mapping and/or the one or more measurements using the first replacement RS beam and the one or more measurements using the second replacement beam. The WTRU 102 may send, in response to the beam switching information, information indicating that: (1) the first TCI state is updated to be associated with the first replacement RS beam as the QCL source for the first set of variable RS beams based on the one or more measurements using the first source RS beam, the one or more measurements using the first replacement RS beam, and the threshold information, and (2) the second TCI state is updated to be associated with the first replacement RS beam as the QCL source for the second set of variable RS beams based on the one or more measurements using the second source RS beam, the one or more measurements using the first replacement RS beam, and the threshold information. For example, the beam switching information may include an index to the mapping.

For example, the WTRU 102 may send the information indicating that the first TCI state is updated to be associated with the first replacement RS beam as the QCL source for the first set of variable RS beams based on a comparison of at least one quantity, based on (e.g., determined from) the one or more measurements using the first source RS beam and the one or more measurements using the first replacement RS beam, and at least one threshold value included in the threshold information.

FIG. 7 is a flow diagram illustrating another example procedure of updating TCI state(s), according to one or more embodiments of the present disclosure. In FIG. 7, a base station (e.g., gNB 180 or other network node) may send configuration information including QCL relation information for one or more TCI states at 702. The one or more TCI states may include a first TCI state associated with a first source RS beam as a QCL source for a first set of variable RS beams. The base station may send one or more transmissions using the first source RS beam at 704 (e.g., which are measured by a WTRU 102). The base station may send beam switching information that includes information indicating a first replacement RS beam is associated with a first variable RS beam at 706. For example, the first variable RS beam may be included in (e.g., is one of) the first set of variable RS beams. At 708, the base station may send one or more transmissions using the first replacement RS beam (e.g., for measurement by a WTRU 102). At 710, the base station may receive, in response to the beam switching information, information indicating that the first TCI state is updated (e.g., at a WTRU 102) to be associated with the first replacement RS beam as the QCL source for the first set of variable RS beams.

For example, the information indicating beam switching may be sent via MAC CE and/or DCI.

For example, the base station may, after receiving the information that the first TCI state is updated at 710, send one or more transmissions (e.g., to the WTRU 102) using (i) the first set of variable RS beams and (ii) the first replacement RS beam as the QCL source for the first set of variable RS beams.

For example, the one or more transmissions using the first source RS beam may include one or more SSBs and/or one or more CSI-RSs.

For example, the one or more transmissions using the first replacement RS beam may include one or more SSBs and/or one or more CSI-RSs.

FIG. 8 is a flow diagram illustrating another example procedure of updating TCI state(s), according to one or more embodiments of the present disclosure. In FIG. 8, a WTRU 102 may receive configuration information including QCL relation information for one or more TCI states at 802. For example, the one or more TCI states include a first TCI state associated with a first source RS beam as a QCL source for a set of variable RS beams. At 804, the WTRU 102 may receive beam switching information that includes information indicating a first replacement RS beam is associated with a first variable RS beam. At 806, the WTRU 102 may determine one or more measurements using a first source RS beam according to one of the TCI states which associates the first source RS beam as the QCL source for a set of variable RS beams which includes the first variable RS beam. At 808, the WTRU 102 may determine one or more measurements using the first replacement RS beam. At 810, the WTRU 102 may send a confirmation indication or failure indication associated with the one of the TCI states in response to the beam switching information.

FIG. 9 is a flow diagram illustrating another example procedure of updating TCI state(s), according to one or more embodiments of the present disclosure. In FIG. 9, a base station (e.g., gNB 180 or other network node) may send configuration information including QCL relation information for one or more TCI states at 902. For example, the one or more TCI states include a first TCI state associated with a first source RS beam as a QCL source for a first set of variable RS beams. At 904, the base station may send one or more transmissions using the first source RS beam. At 906, the base station may send beam switching information that includes information indicating a first replacement RS beam is associated with a first variable RS beam. For example, the first variable RS beam may be included in the first set of variable RS beams. At 908, the base station may send one or more transmissions using the first replacement RS beam. At 910, the base station may receive a confirmation indication or failure indication (e.g., associated with at least one of the TCI states) in response to the beam switching information. For example, the confirmation indication and the failure indication may be indicative of whether a WTRU 102 was able to update at least one of the TCI states based on the beam switching information and the QCL relation information with which the WTRU 102 was configured.

One or more embodiments provide a computer program comprising instructions which when executed by one or more processors cause such processors to perform the encoding and/or decoding methods according to any of the embodiments described above. One or more embodiments also provide a computer readable storage medium having stored thereon instructions for encoding or decoding video data according to the methods described above.

One or more embodiments provide a computer readable storage medium having stored thereon video data generated according to the methods described above. One or more embodiments also provide a method and apparatus for transmitting or receiving video data generated according to the methods described above.

The embodiments described herein may be implemented in, for example, a method or a process, an apparatus, a software program, a data stream, or a signal. Even if only discussed in the context of a single form of implementation (e.g., as a method), the implementation of such features may also be implemented in other forms. An apparatus may be implemented in, for example, appropriate hardware, software, and firmware. Corresponding methods may be implemented in, for example, a processor.

Various numeric values are used in the present application. Such specific values are for example purposes and the embodiments described are not limited to these specific values.

Various methods are described herein, and such methods comprise one or more steps or actions for achieving the described method. Unless a specific order of steps or actions is required for the proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an order to the operations unless specifically required.

The present disclosure may refer to "determining" various pieces of information. Determining information may include one or more of, for example, estimating, calculating, predicting, or retrieving (e.g., from memory) the information.

The present disclosure may refer to "accessing" various pieces of information. Accessing information may include one or more of, for example, receiving, retrieving (e.g., from memory), storing, moving, copying, calculating, determining, predicting, or estimating the information. Similarly, the present disclosure may refer to "receiving" various pieces of information. Receiving information may include one or more of, for example, accessing or retrieving (e.g., from memory) the information.

It is to be understood that use of any of the following "/", "and/or", and "at least one of" is intended to encompass all possible selections of listed items, taken either individually or in any combination thereof.

While specific embodiments have been described in the foregoing description in connection with the accompanying drawings, it should be understood that embodiments described herein are examples only and should not be taken as limiting the scope of the present disclosure or the following claims. Although features and elements are described herein in particular combinations, those of ordinary skill in the art will appreciate that such features or elements may be used alone or in any combination with the other features and elements. It is understood, therefore, that the overall teachings of the present disclosure are not limited to the particular embodiments, implementations, and examples disclosed herein, but are intended to cover variations, modifications, and alternatives as defined by the appended claims and any and all equivalents thereof.

What is claimed is:

1. A wireless transmit/receive unit (WTRU) comprising:
a processor, memory, and a transceiver which are configured to:
receive configuration information including quasi co-location (QCL) relation information for one or more transmission configuration indicator (TCI) states, wherein the one or more TCI states include a first TCI state associated with a first source reference signal (RS) beam as a QCL source for a first set of variable RS beams,
determine one or more measurements using the first source RS beam,
receive beam switching information that includes information indicating a first replacement RS beam is associated with a first variable RS beam, wherein the first variable RS beam is included in the first set of variable RS beams,
determine one or more measurements using the first replacement RS beam, and
send, in response to the beam switching information, information indicating that the first TCI state is updated to be associated with the first replacement RS beam as the QCL source for the first set of variable RS beams based on the one or more measurements using the first source RS beam, the one or more measurements using the first replacement RS beam, and threshold information.

2. The WTRU of claim 1, wherein the information indicating beam switching is received via a medium access control (MAC) control element (CE) or downlink control information (DCI).

3. The WTRU of claim 1, wherein the processor, memory, and the transceiver are configured to, after sending the information that the first TCI state is updated, receive one or more transmissions using (i) the first set of variable RS beams and (ii) the first replacement RS beam as the QCL source for the first set of variable RS beams.

4. The WTRU of claim 1, wherein the one or more TCI states include a second TCI state associated with a second source RS beam as a QCL source for a second set of variable RS beams, wherein the first variable RS beam is included in the second set of variable RS beams, wherein the processor, memory and the transceiver are configured to:

determine one or more measurements using the second source RS beam, send, in response to the beam switching information, information indicating that the second TCI state is updated to be associated with the first replacement RS beam as the QCL source for the second set of variable RS beams based on the one or more measurements using the second source RS beam, the one or more measurements using the first replacement RS beam, and the threshold information.

5. The WTRU of claim 1, wherein the beam switching information includes information indicating a second replacement RS beam is associated with the first variable RS beam, wherein the first variable RS beam is included in the first set of variable RS beams, wherein the processor, memory and the transceiver are configured to:

determine one or more measurements using the second replacement RS beam, send, in response to the beam switching information, the information indicating that the first TCI state is updated to be associated with the first replacement RS beam as the QCL source for the first set of variable RS beams based on (i) a comparison of the one or more measurements using the first replacement RS beam with the one or more measurements using the second replacement RS beam, and (ii) a comparison of a difference, between the one or more measurements using the first source RS beam and the one or more measurements using the first replacement RS beam, with the threshold information.

6. The WTRU of claim 1, wherein the one or more TCI states include a second TCI state associated with a second source reference signal (RS) beam as a QCL source for a second set of variable RS beams, wherein the beam switching information includes information indicating the first replacement RS beam and a second replacement RS beam are associated with the first variable RS beam and a second variable RS beam, wherein the processor, memory and the transceiver are configured to:

determine one or more measurements using the second source RS beam, determine one or more measurements using the second replacement RS beam, select the first replacement RS beam as the QCL source for the first set of variable RS beams and the second set of variable RS beams based on a mapping and/or the one or more measurements using the first replacement RS beam and the one or more measurements using the second replacement RS beam, send, in response to the beam switching information, information indicating that:

(1) the first TCI state is updated to be associated with the first replacement RS beam as the QCL source for the first set of variable RS beams based on the one or more measurements using the first source RS beam, the one or more measurements using the first replacement RS beam, and the threshold information, and (2) the second TCI state is updated to be associated with the first replacement RS beam as the QCL source for the second set of variable RS beams based on the one or more measurements using the second source RS beam, the one or more measurements using the first replacement RS beam, and the threshold information.

7. The WTRU of claim 6, wherein the beam switching information includes an index to the mapping.

8. The WTRU of claim 1, wherein the processor, memory and the transceiver are configured to send the information indicating that the first TCI state is updated to be associated with the first replacement RS beam as the QCL source for the first set of variable RS beams based on a comparison of at least one quantity, based on the one or more measurements using the first source RS beam and the one or more measurements using the first replacement RS beam, and at least one threshold value included in the threshold information.

9. A method implemented by a wireless transmit/receive unit (WTRU), the method comprising:

receiving configuration information including quasi co-location (QCL) relation information for one or more transmission configuration indicator (TCI) states, wherein the one or more TCI states include a first TCI state associated with a first source reference signal (RS) beam as a QCL source for a first set of variable RS beams;

determining one or more measurements using the first source RS beam;

receiving beam switching information that includes information indicating a first replacement RS beam is associated with a first variable RS beam, wherein the first variable RS beam is included in the first set of variable RS beams;

determining one or more measurements using the first replacement RS beam; and sending, in response to the beam switching information, information indicating that the first TCI state is updated to be associated with the first replacement RS beam as the QCL source for the first set of variable RS beams based on the one or more measurements using the first source RS beam, the one or more measurements using the first replacement RS beam, and threshold information.

10. The method of claim 9, wherein the information indicating beam switching is received via a medium access control (MAC) control element (CE) or downlink control information (DCI).

11. The method of claim 9, further comprising:

after sending the information that the first TCI state is updated, receiving one or more transmissions using (i) the first set of variable RS beams and (ii) the first replacement RS beam as the QCL source for the first set of variable RS beams.

12. The method of claim 9, wherein the one or more TCI states include a second TCI state associated with a second source reference signal (RS) beam as a QCL source for a second set of variable RS beams, wherein the beam switching information includes information indicating the second source RS beam is associated with the first variable RS beam, and the first variable RS beam is included in the second set of variable RS beams, the method further comprising:

determining one or more measurements using the second replacement RS beam; and sending, in response to the beam switching information, information indicating that the second TCI state is updated to be associated with the first replacement RS beam as the QCL source for the second set of variable RS beams based on the one or more measurements using the second source RS beam, the one or more measurements using the first replacement RS beam, and the threshold information.

13. The method of claim 9, wherein the beam switching information includes information indicating a second replacement RS beam is associated with the first variable RS beam, wherein the first variable RS beam is included in the first set of variable RS beams, the method further comprising:

determining one or more measurements using the second replacement RS beam; and sending, in response to the beam switching information, the information indicating that the first TCI state is updated to be associated with the first replacement RS beam as the QCL source for the first set of variable RS beams based on (i) a comparison of the one or more measurements using the first replacement RS beam with the one or more measurements using the second replacement RS beam, and (ii) a comparison of a difference, between the one or more measurements using the first source RS beam and the one or more measurements using the first replacement RS beam, with the threshold information.

14. The method of claim 9, wherein the one or more TCI states include a second TCI state associated with a second source reference signal (RS) beam as a QCL source for a second set of variable RS beams, wherein the beam switching information includes information indicating the first replacement RS beam and a second replacement RS beam are associated with the first variable RS beam and a second variable RS beam, the method further comprising:

determining one or more measurements using the second source RS beam;

selecting the first replacement RS beam as the QCL source for the first set of variable RS beams and the second set of variable RS beams based on a mapping; and sending, in response to the beam switching information, information indicating that:

(1) the first TCI state is updated to be associated with the first replacement RS beam as the QCL source for the first set of variable RS beams based on the one or more measurements using the first source RS beam, the one or more measurements using the first replacement RS beam, and the threshold information, and (2) the second TCI state is updated to be associated with the first replacement RS beam as the QCL source for the second set of variable RS beams based on the one or more measurements using the second source RS beam, the one or more measurements using the first replacement RS beam, and the threshold information.

15. The method of claim 9, wherein the beam switching information includes an index to the mapping.

16. The method of claim 9, further comprising:

sending the information indicating that the first TCI state is updated to be associated with the first replacement RS beam as the QCL source for the first set of variable RS beams based on a comparison of at least one quantity, based on the one or more measurements using the first source RS beam and the one or more measurements using the first replacement RS beam, and at least one threshold value included in the threshold information.

17. A base station comprising:

a processor, memory, and a transceiver which are configured to:

send configuration information including quasi co-location (QCL) relation information for one or more transmission configuration indicator (TCI) states, wherein the one or more TCI states include a first TCI state associated with a first source reference signal (RS) beam as a QCL source for a first set of variable RS beams, send one or more transmissions using the first source RS beam, send beam switching information that includes information indicating a first replacement RS beam is associated with a first variable RS beam, wherein the first variable RS beam is included in the first set of variable RS beams, send one or more transmissions using the first replacement RS beam, and receive, in response to the beam switching information, information indicating that the first TCI state is updated to be associated with the first replacement RS beam as the QCL source for the first set of variable RS beams.

18. The base station of claim 17, wherein the information indicating beam switching is sent via a medium access control (MAC) control element (CE) or downlink control information (DCI).

19. The base station of claim 17, wherein the processor, memory, and the transceiver are configured to, after receiving the information that the first TCI state is updated, send one or more transmissions using (i) the first set of variable RS beams and (ii) the first replacement RS beam as the QCL source for the first set of variable RS beams.

20. The base station of claim 17, wherein the one or more transmissions using the first source RS beam include one or more synchronization signal blocks (SSBs) and/or one or more channel state information RSs (CSI-RSs), and/or the one or more transmissions using the first replacement RS beam include one or more SSBs and/or one or more CSI-RSs.

* * * * *